(12) United States Patent
Mahalingam et al.

(10) Patent No.: US 10,970,242 B2
(45) Date of Patent: *Apr. 6, 2021

(54) DIRECT ACCESS TO A HARDWARE DEVICE FOR VIRTUAL MACHINES OF A VIRTUALIZED COMPUTER SYSTEM

(71) Applicant: VMware, Inc., Palo Alto, CA (US)

(72) Inventors: Mallik Mahalingam, Sunnyvale, CA (US); Michael Nelson, Alamo, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/742,847

(22) Filed: Jan. 14, 2020

(65) Prior Publication Data

US 2020/0327076 A1 Oct. 15, 2020

Related U.S. Application Data

(63) Continuation of application No. 15/960,520, filed on Apr. 23, 2018, now Pat. No. 10,534,735, which is a continuation of application No. 14/839,872, filed on Aug. 28, 2015, now Pat. No. 9,952,988, which is a continuation of application No. 14/017,084, filed on Sep. 3, 2013, now Pat. No. 9,122,594, which is a continuation of application No. 12/124,586, filed on May 21, 2008, now Pat. No. 8,527,673.

(Continued)

(51) Int. Cl.
*G06F 13/24* (2006.01)
*G06F 13/10* (2006.01)
*G06F 9/455* (2018.01)
*G06F 12/06* (2006.01)

(52) U.S. Cl.
CPC .......... *G06F 13/24* (2013.01); *G06F 9/45558* (2013.01); *G06F 12/0653* (2013.01); *G06F 13/105* (2013.01); *G06F 2009/45579* (2013.01)

(58) Field of Classification Search
CPC ............. G06F 9/45558; G06F 12/0653; G06F 13/105; G06F 13/24; G06F 2009/45579
See application file for complete search history.

(56) References Cited

U.S. PATENT DOCUMENTS

| 4,843,541 A | 6/1989 | Bean et al. |
| 5,003,468 A | 3/1991 | Watanabe et al. |

(Continued)

*Primary Examiner* — Eric T Oberly

(57) ABSTRACT

In a virtualized computer system in which a guest operating system runs on a virtual machine of a virtualized computer system, a computer-implemented method of providing the guest operating system with direct access to a hardware device coupled to the virtualized computer system via a communication interface, the method including: (a) obtaining first configuration register information corresponding to the hardware device, the hardware device connected to the virtualized computer system via the communication interface; (b) creating a passthrough device by copying at least part of the first configuration register information to generate second configuration register information corresponding to the passthrough device; and (c) enabling the guest operating system to directly access the hardware device corresponding to the passthrough device by providing access to the second configuration register information of the passthrough device.

20 Claims, 19 Drawing Sheets

Related U.S. Application Data

(60) Provisional application No. 60/939,818, filed on May 23, 2007.

(56) References Cited

U.S. PATENT DOCUMENTS

| | | | |
|---|---|---|---|
| 5,835,963 | A | 11/1998 | Yoshioka et al. |
| 5,974,440 | A | 10/1999 | Brooks et al. |
| 6,219,741 | B1 | 4/2001 | Pawlowski et al. |
| 6,393,545 | B1 | 5/2002 | Long et al. |
| 7,000,051 | B2 | 2/2006 | Armstrong et al. |
| 7,209,994 | B1 * | 4/2007 | Klaiber ............... G06F 9/45533 710/260 |
| 7,600,082 | B2 | 10/2009 | Herrell et al. |
| 7,613,847 | B2 | 11/2009 | Kjos et al. |
| 7,721,068 | B2 | 5/2010 | Lowe et al. |
| 7,757,231 | B2 | 7/2010 | Anderson et al. |
| 7,865,893 | B1 | 1/2011 | Omelyanchuk et al. |
| 2005/0246453 | A1 | 11/2005 | Erlingsson et al. |
| 2007/0168643 | A1 | 7/2007 | Hummel et al. |
| 2008/0005297 | A1 | 1/2008 | Kjos et al. |
| 2008/0086729 | A1 | 4/2008 | Kondoh et al. |

* cited by examiner

PCI PASSTHROUGH CONFIG. REGS
347

| DEVICE ID | 347B | VENDOR ID | 347A |
|---|---|---|---|
| STATUS | 347D | COMMAND | 347C |
| CLASS CODE | | 347F | 347E |
| 347J | 347I | 347H | 347G |
| BASE ADDRESS 0 | | | 347K |
| BASE ADDRESS 1 | | | 347L |
| BASE ADDRESS 2 | | | 347M |
| BASE ADDRESS 3 | | | 347N |
| BASE ADDRESS 4 | | | 347O |
| BASE ADDRESS 5 | | | 347P |
| CARDBUS CIS POINTER | | | 347Q |
| SUBSYS ID | 47S | SUB VEN ID | 347R |
| EXP ROM BASE ADDRESS | | | 347T |
| RESERVED | | | 347U |
| RESERVED | | | 347V |
| 347Z | 347Y | 347X | 347W |
| DEVICE-SPECIFIC REGISTERS 347AA | | | |

FIG. 3C

DIRECT ACCESS TO A HARDWARE DEVICE FOR VIRTUAL MACHINES OF A VIRTUALIZED COMPUTER SYSTEM

CROSS-REFERENCE TO RELATED APPLICATION

This application is a continuation of U.S. application Ser. No. 15/960,520 filed Apr. 23, 2018, which is a continuation of U.S. application Ser. No. 14/839,872, filed Aug. 28, 2015, now U.S. Pat. No. 9,952,988 issued on Apr. 24, 2018, which is a continuation U.S. application Ser. No. 14/017,084, filed Sep. 3, 2013, now U.S. Pat. No. 9,122,594 issued on Sep. 1, 2015, which is a continuation of U.S. application Ser. No. 12/124,586, filed May 21, 2008, now U.S. Pat. No. 8,527,673 issued on Sep. 3, 2013, and claims the benefit of, and priority under 35 U.S.C. § 119(e) to U.S. Provisional Application No. 60/939,818, filed May 23, 2008, each of which is incorporated herein by reference.

This application is related to U.S. patent application Ser. No. 12/124,893, entitled "Handling Interrupts When Virtual Machines Have Direct Access to a Hardware Device," filed on May 21, 2008.

BACKGROUND

One or more embodiments of the present invention relate to virtualized computer systems, and, in particular, to a system and method for providing a guest operating system (O/S) in a virtualized computer system with direct access to a hardware device.

General Computer System with a PCI Bus

FIG. 1A shows a general computer system that comprises system hardware 30. System hardware 30 may be a conventional computer system, such as a personal computer based on the widespread "x86" processor architecture from Intel Corporation of Santa Clara, Calif., and system hardware 30 may include conventional components, such as one or more processors, system memory, and a local disk. System memory is typically some form of high-speed RAM (Random Access Memory), whereas the disk (one or more) is typically a non-volatile, mass storage device. System hardware 30 may also include other conventional components such as a memory management unit (MMU), various registers, and various input/output (I/O) devices.

As further shown in FIG. 1A, system hardware 30 includes Central Processing Unit 32 (CPU 32), host/PCI bridge 36, system memory 40, Small Computer System Interface (SCSI) Host Bus Adapter (HBA) card 44 (SCSI HBA 44), Network Interface Card 46 (NIC 46), and graphics adapter 48, each of which may be conventional devices. As further shown in FIG. 1A: (a) CPU 32 is connected to host/PCI bridge 36 by CPU local bus 34 in a conventional manner; (b) system memory 40 is connected to host/PCI bridge 36 by memory bus 38 in a conventional manner; and (c) SCSI HBA 44, NIC 46 and graphics adapter 48 are connected to host/PCI bridge 36 by Peripheral Component Interconnect bus 42 (PCI bus 42) in a conventional manner. As further shown in FIG. 1A, graphics adapter 48 is connected to conventional video monitor 62 in a conventional manner; and NIC 46 is connected to one or more conventional data networks 60 in a conventional manner. Networks 60 may be based on Ethernet technology, for example, and the networks may use the Internet Protocol and the Transmission Control Protocol (TCP/IP), for example. Also, SCSI HBA 44 supports SCSI bus 50 in a conventional manner, and various devices may be connected to SCSI bus 50 in a conventional manner. For example, FIG. 1A shows SCSI disk 52 and tape storage device 54 connected to SCSI bus 50. Other devices may also be connected to SCSI bus 50. SCSI HBA 44 may be an Adaptec Ultra320 or Ultra160 SCSI PCI HBA from Adaptec, Inc., or an LSI Logic Fusion-MPT SCSI HBA from LSI Logic Corporation, for example.

Computer systems generally have system level software and application software executing on the system hardware. As shown in FIG. 1A, system software 21 (system S/W 21) is executing on system hardware 30. As further shown in FIG. 1A, system software 21 includes operating system (OS) 20 and system BIOS (Basic Input/Output System) 22, although other system level software configurations are also possible. OS 20 may be a conventional OS for system hardware 30, such as a Windows OS from Microsoft Corp. or a Linux OS, for example. A Windows OS from Microsoft Corp. may be a Windows Vista OS, Windows XP OS or a Windows 2000 OS, for example, while a Linux OS may be a distribution from Novell, Inc. (SUSE Linux), Mandrakesoft S.A. or Red Hat, Inc. OS 20 may include a set of drivers 24, some of which may be packaged with OS 20, and some of which may be separately loaded onto system hardware 30. Drivers 24 may provide a variety of functions, including supporting interfaces with SCSI HBA 44, NIC 46 and graphics adapter 48. Drivers 24 may also be conventional for system hardware 30 and OS 20. System BIOS 22 may also be conventional for system hardware 30. Finally, FIG. 1A shows a set of one or more applications 10 (APPS 10) executing on system hardware 30. APPS 10 may also be conventional for system hardware 30 and OS 20.

The computer system shown in FIG. 1A may be initialized in a conventional manner. Thus, when the computer system is powered up, or restarted, system BIOS 22 and/or OS 20, or, more generally, system software 21, may detect and configure various aspects of system hardware 30 in a conventional manner. For example, system software 21 may detect and configure devices interacting with PCI bus 42 (i.e., PCI devices) in a conventional manner, including, in particular, SCSI HBA 44. A person of skill in the art will understand how such devices are detected and configured. Briefly, a PCI device typically implements at least 16 "doublewords" of standard configuration registers, where there are 32 bits in a "doubleword." System software 21 attempts to access the configuration registers of PCI devices at each possible location on PCI bus 42, including each PCI slot in system hardware 30. Attempting to access the configuration registers enables system software 21 to determine whether there is a PCI device at each possible location on PCI bus 42, as well as the function or functions that are implemented in each PCI device. System software 21 can then obtain additional information from the configuration registers of each PCI device, and configure such devices appropriately.

If a PCI device implements an extended ROM (Read Only Memory), which may also be referred to as a device ROM or option ROM, then system software 21 typically copies a code image from the ROM on the PCI device into system memory 40 (for example, RAM) within system hardware 30. An initialization module within the code image is typically executed as part of the initialization process, and this may further initialize the PCI device and/or other devices connected to the PCI device. Referring again to FIG. 1A, during the initialization process, system software 21 attempts to access the configuration registers of PCI devices at each possible location on PCI bus 42, and detects graphics adapter 48, NIC 46 and SCSI HBA 44. System software 21 determines the functions implemented in each of these devices, along with other relevant information, and initializes each of the devices appropriately. SCSI HBA 44 typically includes an extended ROM which contains an initialization module that, when executed, initializes SCSI bus 50 and devices connected to SCSI bus 50, including SCSI DISK 52 and tape storage device 54. The initialization of PCI bus 42; devices connected to PCI bus 42, including graphics adapter 48, NIC 46, and SCSI HBA 44; SCSI bus 50; and devices connected to SCSI bus 50, including SCSI disk 52 and tape storage device 54, may all be performed in a conventional manner.

FIG. 1B shows a set of PCI configuration registers 45 for SCSI HBA 44. As described above, during initialization, system software 21 accesses PCI configuration registers 45 to detect the presence of SCSI HBA 44 and to initialize SCSI HBA 44. PCI configuration registers 45 may also be accessed by system software 21 or by other software running on system hardware 30, at other times, for other purposes. FIG. 1B shows, more specifically, Vendor ID (Identifier) register 45A, Device ID register 45B, Command register 45C, Status register 45D, Revision ID register 45E, Class Code register 45F, Cache Line Size register 45G, Latency Timer register 45H, Header Type register 45I, Built-In Self-Test (BIST) register 45J, Base Address 0 register 45K, Base Address 1 register 45L, Base Address 2 register 45M, Base Address 3 register 45N, Base Address 4 register 45O, Base Address 5 register 45P, CardBus Card Information Structure (CIS) Pointer register 45Q, Subsystem Vendor ID register 45R, Subsystem ID register 45S, Expansion ROM Base Address register 45T, first reserved register 45U, second reserved register 45V, Interrupt Line register 45W, Interrupt Pin register 45X, Min_Gnt register 45Y, and Max_Lat register 45Z. Depending on the particular SCSI HBA used, however, one or more of these registers may not be implemented. The format, function and use of these configuration registers, including specific information regarding how to access these configuration registers, are well understood in the art and need not be described further.

FIG. 1B also shows PCI extended configuration space 45AA, which may include a set of Device-capability Registers. The formats of these Device-capability registers are standard, although devices from different vendors may advertise different capabilities. For example, the content of Device-capability Registers 45AA may differ between multiple SCSI HBA devices from different vendors. Finally, the format and content of these registers may even vary for different models of the same type of device from a single vendor.

Referring again to the initialization process, when system software 21 is initializing devices on PCI bus 42, system software 21 reads one or more of PCI configuration registers 45 of SCSI HBA 44, such as Vendor ID register 45A and Device ID register 45B, and determines the presence and type of device SCSI HBA 44 is. System software 21 then reads additional configuration registers, and configures SCSI HBA 44 appropriately, by writing certain values to some of configuration registers 45. In particular, system software 21 reads one or more of Base Address Registers (BARs) 45K, 45L, 45M, 45N, 45O, and 45P to determine how many regions and how many blocks of memory and/or I/O address space SCSI HBA 44 requires, and system software 21 writes to one or more of the Base Address registers to specify address range(s) to satisfy these requirements.

As an example, suppose that Base Address 0 register (BAR 0) 45K indicates that SCSI HBA 44 requires a first number of blocks of I/O address space and that Base Address 1 (BAR 1) register 45L indicates that SCSI HBA 44 requires a second number of blocks of memory address space. This situation is illustrated in FIG. 1C, showing configuration address space 70, I/O address space 72, and memory address space 74. System software 21 may write to Base Address 0 register (BAR 0) 45K and specify I/O region 72A within I/O address space 72, I/O region 72A having a first number of blocks; and system software 21 may write to Base Address 1 register (BAR 1) 45L and specify memory region 74A within memory address space 74, memory region 74A having a second number of blocks. PCI configuration registers 45 of SCSI HBA 44 may be accessed within configuration address space 70. As shown in FIG. 1C, Base Address 0 register 45K contains a pointer to I/O region 72A within I/O address space 72, and Base Address 1 register 45L contains a pointer to memory region 74A within memory address space 74.

Subsequently, system software 21 may determine that SCSI HBA 44 contains an extended ROM, and system software 21 creates a copy of the ROM code in memory and executes the code in a conventional manner. Extended ROM code from SCSI HBA 44 initializes SCSI bus 50 and devices connected to SCSI bus 50, including SCSI DISK 52 and tape storage device 54, generally in a conventional manner.

After the computer system shown in FIG. 1A is initialized, including the PCI devices on PCI bus 42, configuration registers in the respective PCI devices may be accessed on an ongoing basis to interact with the PCI devices and to utilize functions implemented by the PCI devices. In particular, PCI configuration registers 45 in SCSI HBA 44 may be accessed to determine which SCI HBA is connected to PCI bus 42, to determine characteristics of PCI devices connected to SCSI bus 50, and to interface with the PCI devices on SCSI bus 50, all in a conventional manner. For example, configuration registers 45 of SCSI HBA 44 may be used to eventually determine that SCSI DISK 52 and tape storage device 54 are connected to the SCSI bus 50, and to determine various characteristics of these storage devices.

Also, after the computer system shown in FIG. 1A is initialized, software executing on system hardware 30 may perform I/O transfers to and from devices on PCI bus 42, namely I/O writes to devices on PCI bus 42 and I/O reads from devices on PCI bus 42. These I/O transfers are performed in a conventional manner using the memory regions and/or I/O regions specified in the Base Address registers of a PCI device. These I/O transfers may be DMA (Direct Memory Access) transfers from the devices or they may be non-DMA transfers. In the case of SCSI HBA 44, software executing on system hardware 30 may perform I/O transfers to and from devices on SCSI bus 50, through SCSI HBA 44, in a convention manner. For example, such I/O transfers through SCSI HBA 44 may be used to write data to SCSI DISK 52 or to read data from SCSI DISK 52, both in a conventional manner. For an I/O write to SCSI DISK 52, CPU 32 conveys data to SCSI HBA 44, which then sends the data across SCSI bus 50 to SCSI DISK 52; while, for an I/O read from SCSI DISK 52, SCSI DISK 52 transmits data across SCSI bus 50 to SCSI HBA 44, and SCSI HBA 44 sends the data to CPU 32. In the example shown in FIG. 1C, such I/O transfers may be performed using I/O region 72A or memory region 74A. Such I/O transfers may be performed, for example, by SCSI driver 24 on behalf of application software in one of applications 10.

These I/O transfers to and from PCI devices may be further broken down into (a) transactions initiated by CPU 32 and (b) transactions initiated by PCI devices. Non-DMA I/O transfers involve only CPU-initiated transactions. For a non-DMA write, CPU 32 initiates the transfer, writes data to the PCI device, and the PCI device receives the data, all in the same transaction. For a non-DMA read, CPU 32 initiates the transfer and the PCI device retrieves the data and provides it to CPU 32, again all in the same transaction. Thus, non-DMA I/O transfers may be considered simple CPU accesses to the PCI devices.

DMA I/O transfers, in contrast, involve transactions initiated by the PCI devices. For a DMA write transfer, CPU 32 first writes data to a memory region without any involvement by a PCI device. CPU 32 then initiates the DMA transfer in a first transaction, involving a CPU access to the PCI device. Subsequently, the PCI device reads the data from the memory region in a second transaction. This second transaction may be considered a "DMA operation" by the PCI device. For a DMA read operation, CPU 32 initiates the DMA transfer in a first transaction, involving a CPU access to the PCI device. The PCI device then retrieves the data and writes it into a memory region in a second transaction, which may also be considered a "DMA operation" by the PCI device. Next, the CPU reads the data from the memory region without any further involvement by the PCI device. Thus, DMA I/O transfers to and from a PCI device generally involves both a CPU access to the PCI device and a DMA operation by the PCI device.

In addition to accesses to configuration registers of PCI devices and I/O transfers to and from PCI devices, PCI devices also typically generate interrupts to CPU 32 for various reasons, such as, completion of a DMA transfer. Such interrupts may be generated and handled in a conventional manner.

In summary, there are four general types of transactions that occur between CPU 32 and a PCI device, such as SCSI HBA 44. A first transaction type ("a configuration transaction") involves an access by CPU 32 to configuration registers of the PCI device, such as PCI configuration registers 45 of SCSI HBA 44. A second transaction type ("an I/O transaction") involves an access by CPU 32 to the PCI device, through the memory and/or I/O region(s) specified by the Base Address registers of the PCI device, such as I/O region 72A or memory region 74A for SCSI HBA 44 in the example shown in FIG. 1C. A third transaction type ("a DMA operation") involves a DMA operation by the PCI device, which involves a read from or a write to a memory region specified by a Base Address register of the PCI device, such as memory region 74A for SCSI HBA 44 in the example shown in FIG. 1C. A fourth transaction type ("an interrupt") involves an interrupt from the PCI device to CPU 32, such as upon completion of a DMA transfer.

General Virtualized Computer System

As is well known in the field of computer science, a virtual machine (VM) is an abstraction—a "virtualization"—of an actual physical computer system. FIG. 2A shows one possible arrangement of a computer system that implements virtualization. As shown in FIG. 2A, one or more VMs 300, or "guests," are installed on a "host platform," or simply "host," which includes system hardware, and one or more layers or co-resident components comprising system-level software, such as an operating system or similar kernel, or a virtual machine monitor or hypervisor (see below), or some combination of these. The system hardware typically includes one or more processors, memory, some form of mass storage, and various other devices.

The computer system shown in FIG. 2A has the same system hardware 30 as is shown in FIG. 1A and described above. Thus, system hardware 30 shown in FIG. 2A also includes CPU 32, host/PCI bridge 36, system memory 40, SCSI HBA 44, NIC 46, and graphics adapter 48 shown in FIG. 1A, although these components are not illustrated in FIG. 2A for simplicity. As also illustrated in FIG. 1A, but not in FIG. 2A, CPU 32 is connected to host/PCI bridge 36 by CPU local bus 34, in a conventional manner; system memory 40 is connected to host/PCI bridge 36 by memory bus 38, in a conventional manner; and SCSI HBA 44, NIC 46 and graphics adapter 48 are connected to host/PCI bridge 36 by PCI bus 42, in a conventional manner.

FIG. 2A also shows the same video monitor 62, the same networks 60 and the same SCSI bus 50 as are shown in FIG. 1A, along with the same SCSI DISK 52 and the same tape storage device 54, which are again shown as being connected to SCSI bus 50. Other devices may also be connected to SCSI bus 50. Thus, graphics adapter 48 (not shown in FIG. 2A) is connected to video monitor 62 in a conventional manner; NIC 46 (not shown in FIG. 2A) is connected to data networks 60 in a conventional manner; and SCSI HBA 44 (not shown in FIG. 2A) supports SCSI bus 50 in a conventional manner.

Guest system software runs on VMs 300. Each virtual machine monitor 200 (VMM 200) (or a software layer where VM 300 and VMM 200 overlap) typically includes virtual system hardware 330. Virtual system hardware 330 typically includes at least one virtual CPU, some virtual memory, and one or more virtual devices. All of the virtual hardware components of the VM may be implemented in software using known techniques to emulate the corresponding physical components.

FIG. 2B shows aspects of virtual system hardware 330. For the example virtual computer systems of FIGS. 2A and 2B, virtual system hardware 330 is functionally similar to underlying physical system hardware 30, although, for other virtual computer systems, the virtual system hardware may be quite different from the underlying physical system hardware. Thus, FIG. 2B shows processor (CPU or Central Processing Unit) 332, host/PCI bridge 336, system memory 340, SCSI HBA 344, NIC 346, and graphics adapter 348, each of which may be implemented as conventional devices that are substantially similar to their corresponding devices in underlying physical hardware 30. As shown in FIG. 2B, CPU 332 appears to be connected to host/PCI bridge 336 in a conventional manner, as if by CPU local bus 334; system memory 340 appears to be connected to host/PCI bridge 336 in a conventional manner, as if by memory bus 338; and SCSI HBA 344, NIC 346 and graphics adapter 348 appear to be connected to host/PCI bridge 336 in a conventional manner, as if by PCI bus 342.

As further shown in FIG. 2B, graphics adapter 348 appears to be connected to conventional video monitor 362 in a conventional manner; NIC 346 appears to be connected to one or more conventional data networks 360 in a conventional manner; SCSI HBA 344 appears to support SCSI bus 350 in a conventional manner; and virtual disk 352 and tape storage device 354 appear to be connected to SCSI bus 350, in a conventional manner. Virtual disk 352 typically represents a portion of SCSI DISK 52. It is common for virtualization software to provide guest software within a VM with access to some portion of a SCSI DISK, including possibly a complete Logical Unit Number (LUN), multiple complete LUNs, some portion of a LUN, or even some combination of complete and/or partial LUNs. Whatever portion of the SCSI DISK is made available for use by the guest software, within the VM the portion is often presented to the guest software in the form of one or more complete virtual disks. Methods for virtualizing a portion of a SCSI DISK as one or more virtual disks are known in the art.

Other than presenting a portion of SCSI DISK 52 as a complete virtual disk 352, all of the virtual devices illustrated in FIG. 2B may be emulated in such a manner that they are functionally similar to the corresponding physical devices illustrated in FIG. 1A, or, alternatively, the virtual devices may be emulated so as to make them quite different from the underlying physical devices.

Guest system software in VMs 300 of FIG. 2A includes OS 320, including a set of drivers 324, and system BIOS 322. FIG. 2A also shows one or more applications 310 running within VMs 300. OS 320 may be substantially the same as OS 20 of FIG. 1A, or it may be substantially different; drivers 324 may be substantially the same as drivers 24 of FIG. 1A, or they may be substantially different; system BIOS 322 may be substantially the same as system BIOS 22 of FIG. 1A, or it may be substantially different; and applications 310 may be substantially the same as applications 10 of FIG. 1A, or they may be substantially different. Also, each of these software units may be substantially the same between different VMs, as suggested in FIG. 2A, or they may be substantially different.

Note that a single VM may be configured with more than one virtualized processor. To permit computer systems to scale to larger numbers of concurrent threads, systems with multiple CPUs have been developed. For example, symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. In addition, another configuration is found in a so-called "multi-core" architecture, in which more than one physical CPU is fabricated on a single chip, with its own set of functional units (such as a floating-point unit and an arithmetic/logic unit ALU), and in which threads can execute independently; multi-core processors typically share only limited resources, such as some cache. In further addition, a technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc.

Applications 310 running on a VM function as they would if run on a "real" computer, even though the applications are running at least partially indirectly, that is via guest OS 320 and virtual processor(s). Executable files are accessed by the guest OS from a virtual disk or virtual memory, which will be portions of an actual physical disk or memory allocated to that VM. Once an application is installed within a VM, the guest OS retrieves files from the virtual disk just as if the files had been pre-stored as the result of a conventional installation of the application. The design and operation of virtual machines are well known in the field of computer science.

Some interface is generally required between guest software within a VM and various hardware components and devices in an underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component (s) to support the virtualization. Moreover, in some systems, some virtualization code is included in at least one "superior" VM to facilitate the operations of other VMs. Furthermore, specific software support for VMs may be included in a host OS itself.

FIG. 2A shows virtual machine monitors 200 that appear as separate entities from other components of the virtualization software. Furthermore, some software components are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware.

Various virtualized hardware components may be considered to be part of VMM 200 for the sake of conceptual simplicity. In actuality, these "components" are usually implemented as software emulations by virtual device emulators 202 included in the VMMs. One advantage of such an arrangement is that the VMMs may (but need not) be set up to expose "generic" devices, which facilitate VM migration and hardware platform-independence.

Different systems may implement virtualization to different degrees—the term "virtualization" generally relates to a spectrum of definitions rather than to a bright line, and often reflects a design choice with respect to a trade-off between speed and efficiency on the one hand and isolation and universality on the other hand. For example, the term "full virtualization" is sometimes used to denote a system in which no software components of any form are included in a guest other than those that would be found in a non-virtualized computer; thus, a guest OS could be an off-the-shelf, commercially available OS with no components included specifically to support use in a virtualized environment.

In contrast, term, which has yet to achieve a universally accepted definition, is that of "para-virtualization." As the term implies, a "para-virtualized" system is not "fully" virtualized, but rather a guest is configured in some way to provide certain features that facilitate virtualization. For example, a guest in some para-virtualized systems is designed to avoid hard-to-virtualize operations and configurations, such as by avoiding certain privileged instructions, certain memory address ranges, etc. As another example, many para-virtualized systems include an interface within a guest that enables explicit calls to other components of the virtualization software.

For some, the term para-virtualization implies that a guest OS (in particular, its kernel) is specifically designed to support such an interface. According to such a view, having, for example, an off-the-shelf version of Microsoft Windows XP as a guest OS would not be consistent with the notion of para-virtualization. Others define the term para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS, as such, is an off-the-shelf, commercially available OS not specifically designed to support a virtualized computer system.

In addition to the sometimes fuzzy distinction between full and partial (para-) virtualization, two arrangements of intermediate system-level software layer(s) are in general use—a "hosted" configuration and a non-hosted configuration (which is shown in FIG. 2A). In a hosted virtualized computer system, an existing, general-purpose operating system forms a "host" OS that is used to perform certain input/output (I/O) operations, alongside and sometimes at the request of the VMM. A Workstation virtualization product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 2A, in many cases, it may be beneficial to deploy VMMs on top of a software layer—kernel 100 (also referred to as VMKernel 100)—constructed specifically to provide efficient support for VMs. This configuration is frequently referred to as being "non-hosted." Compared with a system in which VMMs run directly on the hardware platform, use of a kernel offers greater modularity and facilitates provision of services that extend across multiple virtual machines. Thus, the VMM may include resource manager 102, for example, for managing resources across multiple virtual machines. Compared with a hosted deployment, a kernel may offer greater performance because it can be co-developed with the VMM and be optimized for the characteristics of a workload consisting primarily of VMs/VMMs. Kernel 100 may also handle other applications running on it that can be separately scheduled, as well as a console operating system that, in some architectures, is used to boot the system and facilitate certain user interactions with the virtualization software.

Note that VMkernel 100 shown in FIG. 2A is not the same as a kernel that will be within guest OS 320—as is well known, every operating system has its own kernel. Note also that kernel 100 is part of the "host" platform of the VM/VMM as defined above even though the configuration shown in FIG. 2A is commonly termed "non-hosted;" moreover, VMkernel 100 is part of the host and part of the virtualization software or "hypervisor." The difference in terminology is one of perspective and definitions that are still evolving in the art of virtualization.

One of device emulators 202 emulates virtual SCSI HBA 344, using physical SCSI HBA 44 to actually perform data transfers, etc. Thus, for example, if guest software attempts to read data from what it sees as virtual disk 352, SCSI device driver 324 typically interacts with what it sees as SCSI HBA 344 to request the data. Device emulator 202 responds to SCSI device driver 324, and causes physical SCSI HBA 44 to read the requested data from an appropriate location within physical SCSI DISK 52. Device emulator 202 typically has to translate a SCSI I/O operation initiated by SCSI device driver 324 into a corresponding SCSI operation issued to SCSI HBA 44, and finally onto SCSI DISK 52. Methods for emulating disks and SCSI DISKs, and for translating disk operations during such emulations, are known in the art.

During the operation of VM 300, SCSI device driver 324 typically interacts with virtual SCSI HBA 344 just as if it were a real, physical SCSI HBA. At different times, SCSI device driver 324 may exercise different functionality of virtual SCSI HBA 344, and so device emulator 202 typically must emulate all the functionality of the virtual SCSI HBA. However, device emulator 202 does not necessarily have to emulate all of the functionality of physical SCSI HBA 44. Virtual SCSI HBA 344 emulated by device emulator 202 may be substantially different from physical SCSI HBA 44. For example, virtual SCSI HBA 344 may be more of a generic SCSI HBA, implementing less functionality than physical SCSI HBA 44. Nonetheless, device emulator 202 typically emulates all the functionality of some SCSI HBA. Thus, for example, SCSI driver 324 may attempt to access the PCI configuration registers of virtual SCSI HBA 344, and device emulator 202 typically must emulate the functionality of the configuration registers.

FIG. 2C illustrates a set of emulated or virtual PCI configuration registers 345. Specifically, FIG. 2C shows Vendor ID register 345A, Device ID register 345B, Command register 345C, Status register 345D, Revision ID register 345E, Class Code register 345F, Cache Line Size register 345G, Latency Timer register 345H, Header Type register 345I, BIST register 345J, Base Address 0 register 345K, Base Address 1 register 345L, Base Address 2 register 345M, Base Address 3 register 345N, Base Address 4 register 345O, Base Address 5 register 345P, CardBus CIS Pointer register 345Q, Subsystem Vendor ID register 345R, Subsystem ID register 345S, Expansion ROM Base Address register 345T, first reserved register 345U, second reserved register 345V, Interrupt Line register 345W, Interrupt Pin register 345X, Min_Gnt register 345Y, and Max_Lat register 345Z. As with physical SCSI HBA 44, one or more of these registers may not be implemented, depending on the particular SCSI HBA that is emulated as virtual SCSI HBA 344. Also, the registers that are implemented in virtual PCI configuration registers 345 may differ from the registers that are implemented in physical PCI configuration registers 45. FIG. 2C also shows Virtual PCI Extended Configuration Space (including a set of Device-Specific Registers) 345AA.

The contents of virtual PCI configuration registers 345 are generally different from the contents of physical PCI configuration registers 45, and the format of Device-Specific Registers 345AA may be different from the format of Device-Specific Registers 45AA, typically depending more on the design and implementation of the virtualization software than on the characteristics of physical SCSI HBA 44 or any connected SCSI devices. For example, the virtualization software may be implemented so as to allow a VM to be migrated from one physical computer to another physical computer. A VM may be migrated from a first physical computer to a second physical computer by copying VM state and memory state information for the VM from the first computer to the second computer, and restarting the VM on the second physical computer. Migration of VMs is more practical and efficient if the VMs include more generic virtual hardware that is independent of the physical hardware of the underlying computer system. Thus, virtual PCI configuration registers 345 for such an implementation would reflect the generic virtual hardware, instead of the underlying physical hardware of the computer on which the VM is currently running. Thus, there may be no, or only limited, correlation between the contents of virtual PCI configuration registers 345 and physical PCI configuration registers 45, and between the format of virtual Device-Specific Registers 345AA and physical Device-Specific Registers 45AA.

FIG. 2D illustrates configuration address space 370 corresponding to virtual PCI configuration register 345. As an example, suppose that Base Address 0 register (BAR 0) 345K indicates that SCSI HBA 344 requires a first number of blocks of I/O address space and that Base Address 1

(BAR 1) register 345L indicates that SCSI HBA 344 requires a second number of blocks of memory address space. As shown in FIG. 2D, guest OS 320 may write to Base Address 0 register (BAR 0) 345K and specify I/O region 372A within I/O address space 372, I/O region 372A having the first number of blocks; and guest OS 320 may write to Base Address 1 register (BAR 1) 345L and specify memory region 374A within memory address space 374, memory region 374A having the second number of blocks. PCI configuration registers 345 of SCSI HBA 344 may be accessed within configuration address space 370. Base Address 0 register 345K contains a pointer to I/O region 372A within I/O address space 372, and Base Address 1 register 345L contains a pointer to memory region 374A within memory address space 374.

Subsequently, guest OS 320 may determine that virtual SCSI HBA 344 contains an extended ROM, and guest OS 320 creates a copy of the ROM code in memory and executes the code in a conventional manner. The extended ROM code from virtual SCSI HBA 344 initializes virtual SCSI bus 350 and the devices connected to virtual SCSI bus 350, including virtual SCSI DISK 352 and virtual tape storage device 354, generally in a conventional manner.

In general, conventional virtualized computer systems do not allow guest OS 320 to control the actual physical hardware devices. For example, guest OS 320 running on VM 300 would not have direct access to SCSI HBA 44 or SCSI disk 52. This is because virtualized computer systems have virtualization software such as VMM 200 and VMKernel 100 coordinate each VM's access to the physical devices to allow multiple VMs 300 to run on shared system H/W 30 without conflict.

SUMMARY

One or more embodiments of the present invention include a computer-implemented method of providing a guest operating system running on a virtual machine in a virtualized computer system with direct access to a hardware device coupled to the virtualized computer system via a communication interface. In particular, in accordance with one embodiment, in a virtualized computer system in which a guest operating system runs on a virtual machine of a virtualized computer system, a computer-implemented method of providing the guest operating system with direct access to a hardware device coupled to the virtualized computer system via a communication interface that comprises: (a) obtaining first configuration register information corresponding to the hardware device, the hardware device connected to the virtualized computer system via the communication interface; (b) creating a passthrough device by copying at least part of the first configuration register information to generate second configuration register information corresponding to the passthrough device; and (c) enabling the guest operating system to directly access the hardware device corresponding to the passthrough device by providing access to the second configuration register information of the passthrough device.

BRIEF DESCRIPTION OF THE DRAWINGS

FIG. 3C illustrates a set of virtual PCI configuration registers for the PCI passthrough SCSI disk, according to one embodiment of the present invention.

DETAILED DESCRIPTION

The inventors have determined that, at least sometimes, there is a need for a virtual machine (VM) in a virtualized computer system, for example, a guest operating system (OS) running on a VM to have direct access to physical hardware devices, such as, for example and without limitation, physical PCI devices. For example, and without limitation, direct access to physical hardware devices may be needed for better I/O (Input/Output) performance. As a further example, with direct access to physical hardware devices, a VM may be able to manage the physical hardware devices directly, and backup physical hardware devices such as SCSI disks directly. In addition, by trapping port and memory mapped operations to/from the physical hardware devices that are exposed to the VM for direct access, it is possible to study the behavior of the physical hardware devices from the VM as a debugging mechanism.

One or more embodiments of the present invention relate to providing limited, direct access to a physical device from within a computing environment that is at least partially virtualized. One or more embodiments of the present invention may be implemented in a wide variety of physical computer systems, which physical computer systems have a wide variety of hardware platforms and configurations, and a wide variety of software platforms and configurations. In particular, one or more embodiments of the present invention may be implemented in computer systems having varying degrees and/or types of virtualization with VMs having any number of physical and/or logical virtualized processors, including fully virtualized computer systems (both hosted and non-hosted virtualized computer systems), partially virtualized systems (regardless of the degree of virtualization), i.e., so-called para-virtualized computer systems, and a wide variety of other types of virtual computer systems, including virtual computer systems in which a virtualized hardware platform is substantially the same as or substantially different from an underlying physical hardware platform. In addition, one or more embodiments of the present invention may also be implemented to provide limited, direct access to a wide variety of physical devices that may interface with a physical computer system in a variety of ways.

Figure 1A:
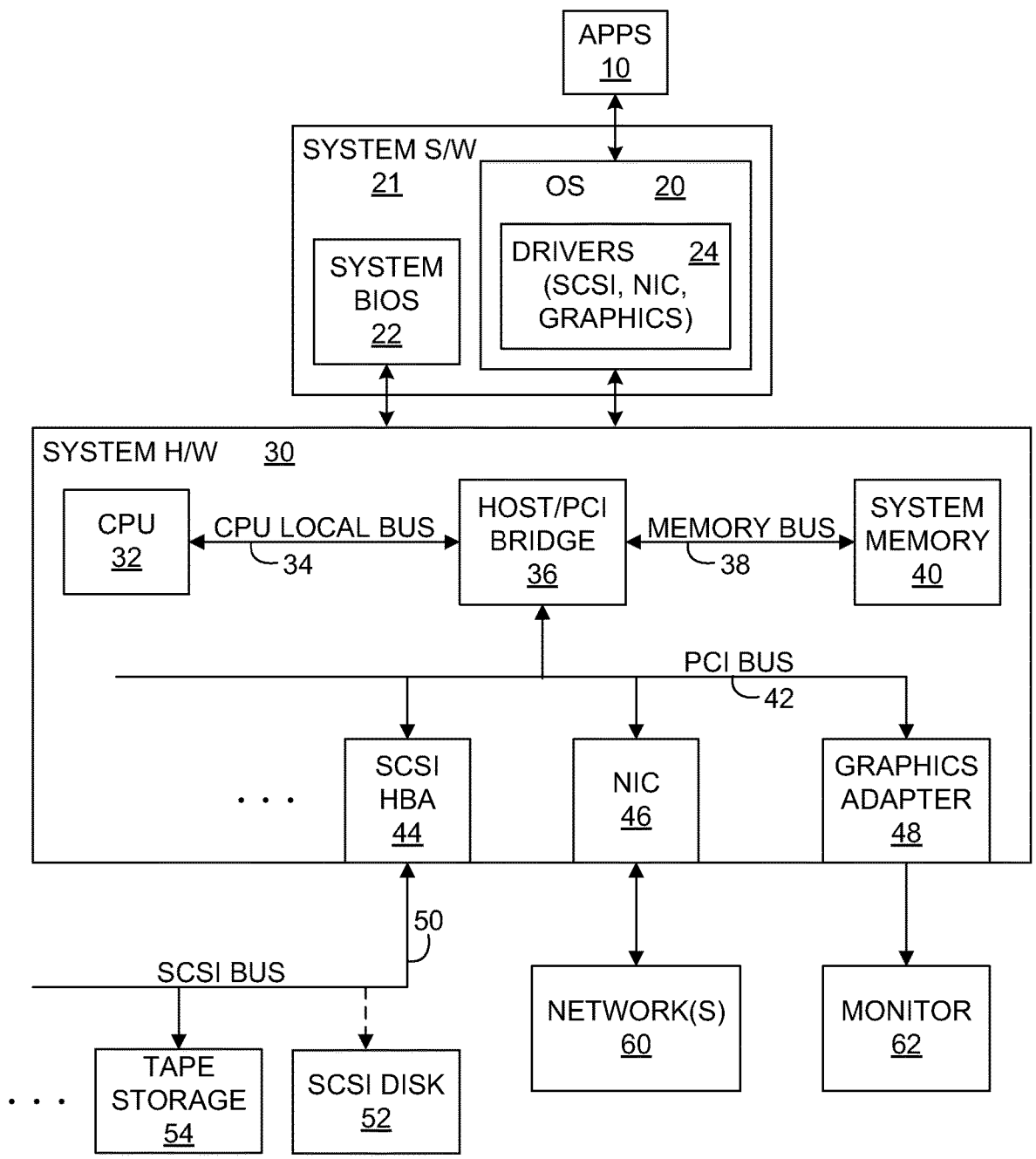
FIG. 1A illustrates a general, non-virtualized computer system having a PCI bus and a SCSI HBA PCI device, supporting a SCSI bus.
Figure 2A:
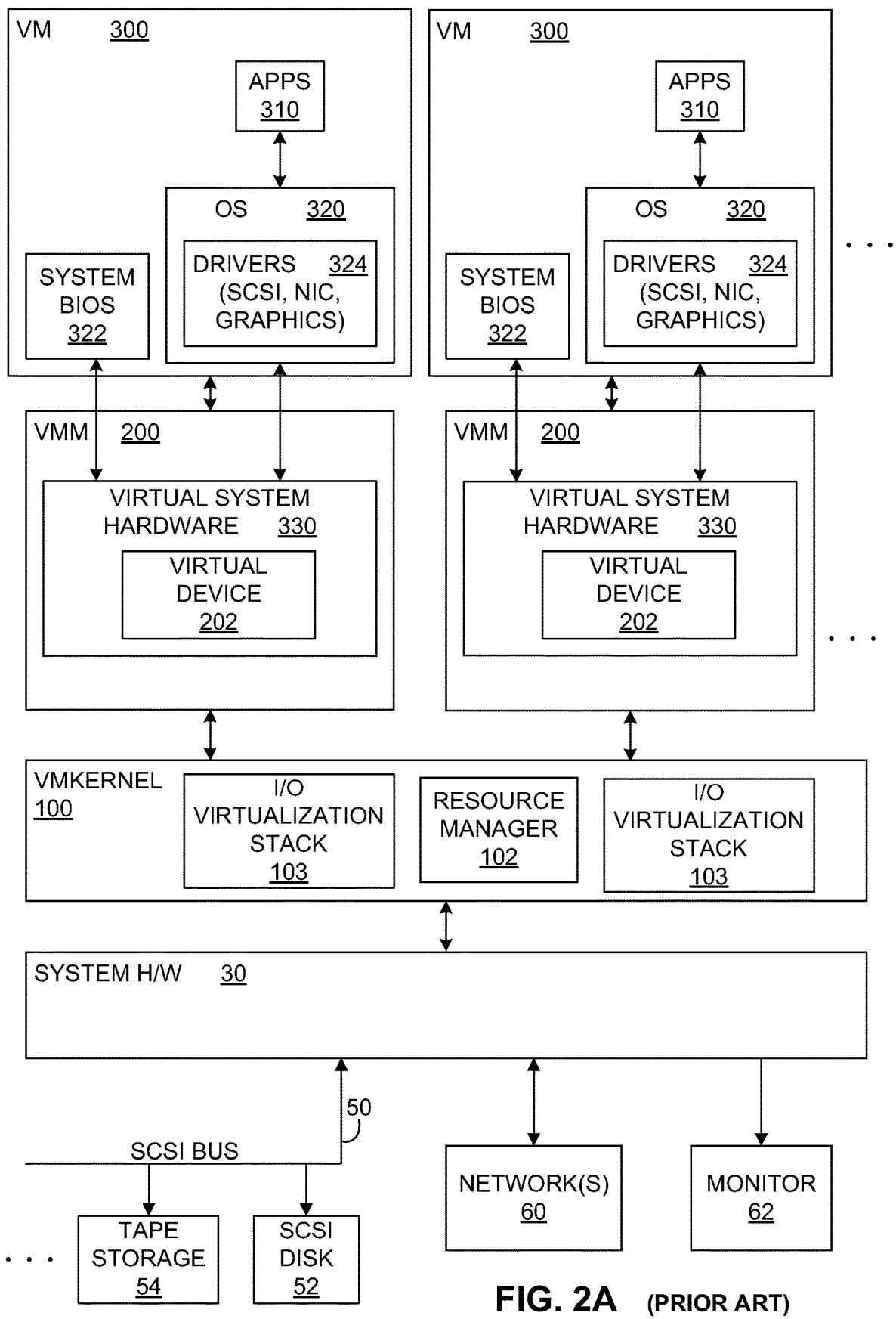
FIG. 2A illustrates the main components of a general, kernel-based, virtual computer system, in which the physical system hardware includes a PCI bus and a SCSI HBA PCI device, supporting a SCSI bus.
Figure 2B:
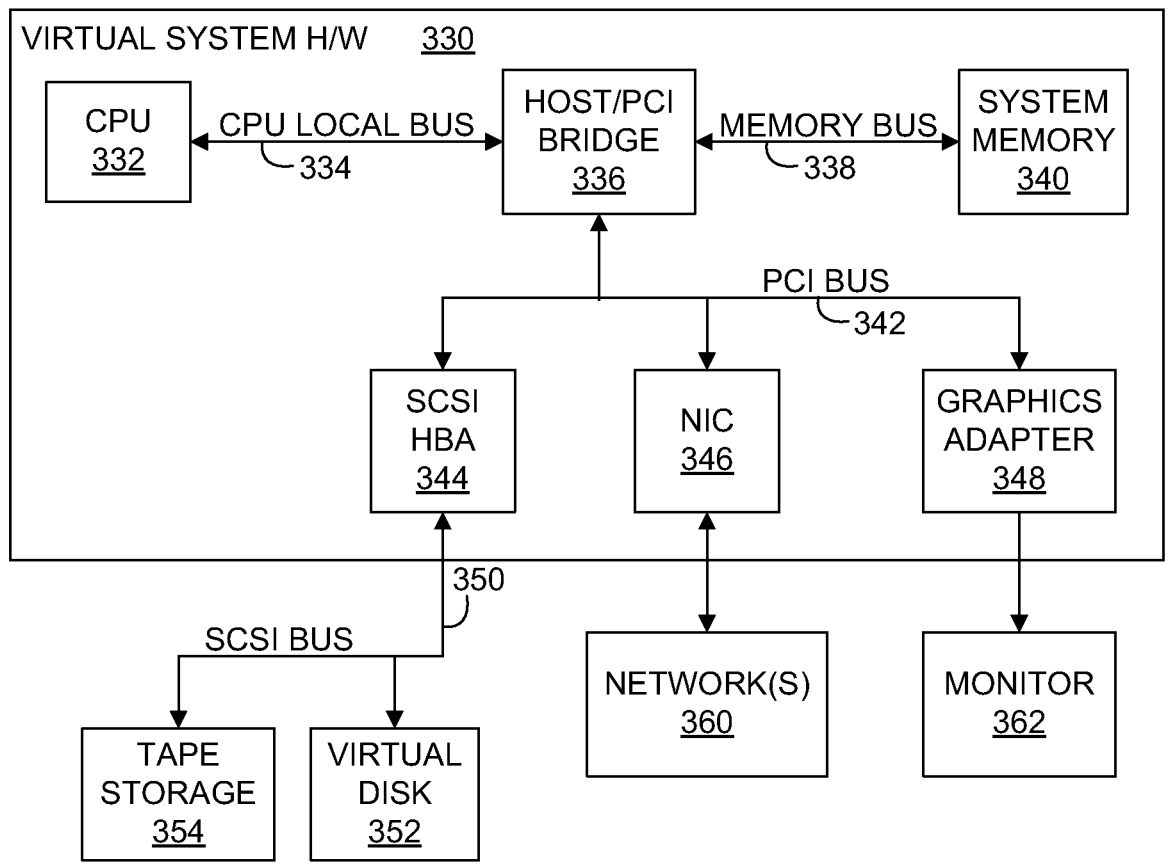
FIG. 2B illustrates a virtual system hardware for the virtual machines of FIG. 2A, including a virtual PCI bus and a virtual SCSI HBA PCI device, supporting a virtual SCSI bus.
Figure 3A:
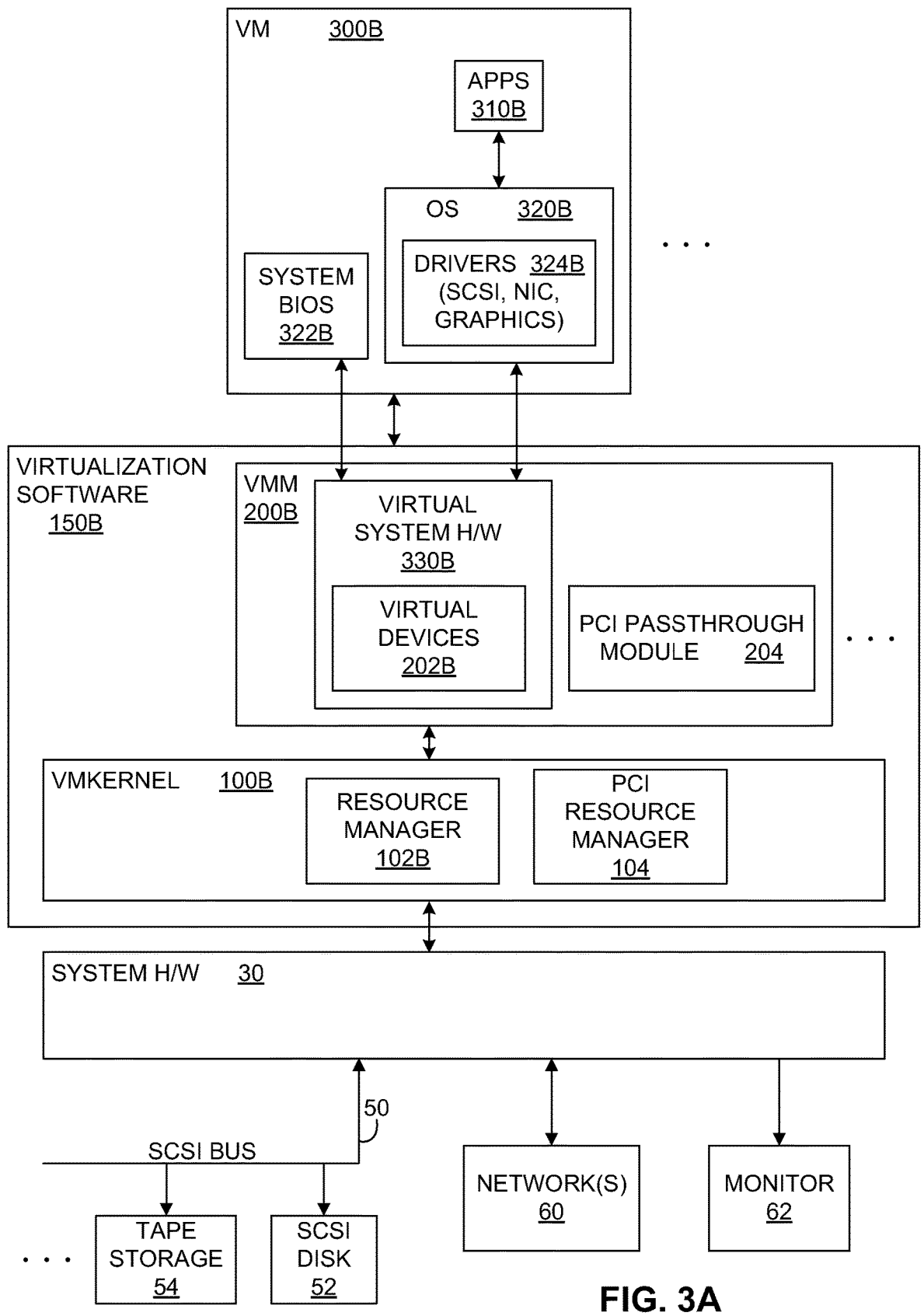
FIG. 3A illustrates an embodiment of the present invention in a generalized, kernel-based, virtual computer system, in which the physical system hardware includes a PCI bus and a SCSI HBA PCI device, supporting a SCSI bus.

FIG. 3A illustrates an embodiment of the present invention in a generalized, kernel-based, virtual computer system, in which the physical system hardware includes a PCI bus and a SCSI HBA PCI device, supporting a SCSI bus. The computer system shown in FIG. 3A has the same system hardware 30 as that shown in FIGS. 1A and 2A, and as is described above. Thus, system hardware 30 of FIG. 3A also includes CPU 32, host/PCI bridge 36, system memory 40, SCSI HBA 44, NIC 46, and graphics adapter 48 of FIG. 1A, although these devices are not illustrated in FIG. 3A for simplicity. As is also illustrated in FIG. 1A, but not in FIG. 3A, CPU 32 is connected to host/PCI bridge 36 by CPU local bus 34, in a conventional manner; system memory 40 is connected to host/PCI bridge 36 by memory bus 38, in a conventional manner; and SCSI HBA 44, NIC 46 and graphics adapter 48 are connected to host/PCI bridge 36 by PCI bus 42, in a conventional manner. FIG. 3A also shows the same video monitor 62, the same networks 60 and the same SCSI bus 50 as are shown in FIGS. 1A and 2A, along with the same SCSI DISK 52 and the same tape storage device 54, which are again shown as being connected to SCSI bus 50. Other devices may also be connected to SCSI bus 50. Thus, graphics adapter 48 (not shown in FIG. 3A) is connected to video monitor 62 in a conventional manner; NIC 46 (not shown in FIG. 3A) is connected to networks 60 in a conventional manner; and SCSI HBA 44 (not shown in FIG. 3A) supports SCSI bus 50 in a conventional manner.

FIG. 3A also shows VMkernel 100B, which, except as described below, may be substantially the same as kernel 100 of FIG. 2A. Thus, VMkernel 100B includes resource manager 102B, which, except as described below, may be substantially the same as resource manager 102 of FIG. 2A. Note that VMKernel 100B also includes PCI resource manager 104. As will be explained below, PCI resource manager 104 manages the resources of PCI passthrough module 204 that is created in accordance with one or more embodiments of the present invention, to provide functions such as creating and managing a configuration register for PCI passthrough devices.

FIG. 3A also shows VMM 200B, which, except as described below, may be substantially the same as VMM 200 of FIG. 2A. Thus, VMM 200B includes virtual system hardware 330B, which includes a set of virtual devices 202B, which, except as described below, may be substantially the same as virtual devices 202 of FIG. 2A. Note also that VMM 200B includes PCI passthrough module 204 that is created in accordance with one or more embodiments of the present invention. PCI passthrough module 204 is a software module in VMM 200B as a virtualization module for providing VM 300B with direct access to a corresponding physical hardware device. As will be explained below in more detail, PCI passthrough module 204 advertises hardware devices to appear in the virtual PCI bus hierarchy, provides transparent/non-transparent mapping to hardware devices, handles interrupts from passthrough devices, and serves as a conduit for accessing the passthrough devices. As shown in FIG. 3A, VMkernel 100B and VMM 200B may generally be referred to as virtualization software 150B. Such virtualization software may take a wide variety of other forms in other implementations of the invention.

FIG. 3A also shows VM 300B, which, except as described below, may be substantially the same as VMs 300 of FIG. 2A. Thus, VM 300B includes a set of applications 310B, which may be substantially the same as the set of applications 310 of FIG. 2A; OS 320B, which may be substantially the same as OS 320 of FIG. 2A; a set of drivers 324B, which may be substantially the same as the set of drivers 320 of FIG. 2A; and system BIOS 322B, which may be substantially the same as system BIOS 322 of FIG. 2A. OS 320B, drivers 324B and system BIOS 322B constitute guest system software for VM 300B. The guest system software has direct access to a physical hardware device through PCI passthrough module 204 under resource management by PCI resource manager 104.

Figure 3B:
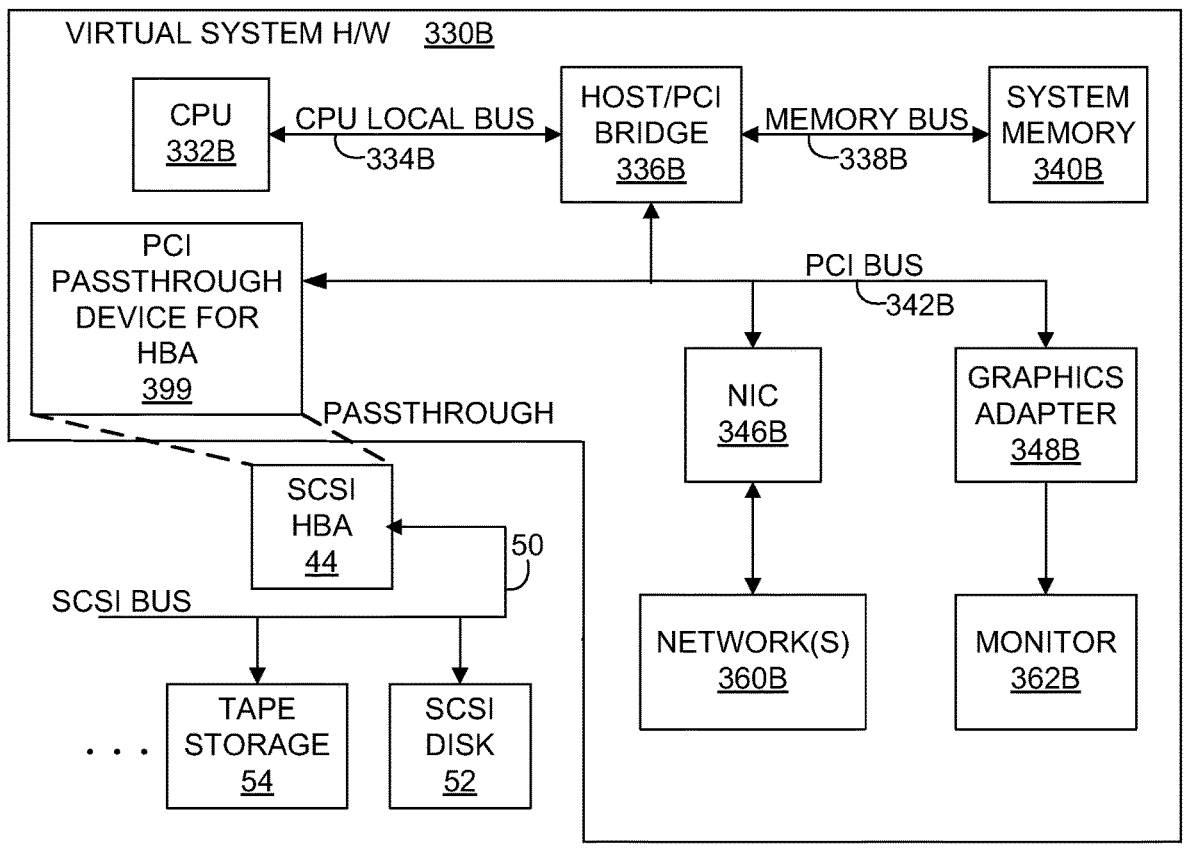
FIG. 3B illustrates a virtual system hardware for the virtual machine of FIG. 3A, including a PCI passthrough SCSI disk, a virtual PCI bus and a virtual SCSI HBA PCI device, supporting a virtual SCSI bus, according to one embodiment of the present invention.

As also shown in FIG. 3A, VM 300B includes virtual system hardware 330B, which, except as described below, may be substantially the same as virtual system hardware 330 of FIG. 2A. FIG. 3B shows aspects of virtual system hardware 330B that are most relevant to one or more embodiments of the present invention. Again, for the example virtual computer system of FIGS. 3A and 3B, virtual system hardware 330B is functionally similar to the underlying physical system hardware 30, although, for other virtual computer systems, the virtual system hardware may be quite different from the underlying physical system hardware. Thus, FIG. 3B shows processor (CPU or Central Processing Unit) 332B, host/PCI bridge 336B, system memory 340B, NIC 346B, and graphics adapter 348B, each of which may be implemented as conventional devices, substantially similar to the corresponding devices in the underlying physical hardware 30. Processor 332B appears to be connected to host/PCI bridge 336B in a conventional manner, as if by CPU local bus 334B; system memory 340B appears to be connected to host/PCI bridge 336B in a conventional manner, as if by memory bus 338B; and SCSI HBA 344B, NIC 346B and graphics adapter 348B appear to be connected to host/PCI bridge 336B in a conventional manner, as if by PCI bus 342B. Graphics adapter 348B appears to be connected to conventional video monitor 362B in a conventional manner; and NIC 346B appears to be connected to one or more conventional data networks 360B in a conventional manner.

As shown in FIG. 3B, virtual system hardware 330B includes PCI passthrough device for HBA 399 that is connected to PCI bus 342B. In accordance with one or more embodiments of the present invention, PCI passthrough device 399 in FIG. 3B is a virtualization of SCSI HBA 44 that controls SCSI disk 52, but it is virtually connected to virtual PCI bus 342B so that VM 300B can have direct access to SCSI HBA 44 through PCI passthrough device 399 as if SCSI HBA 44 is directly connected to VM 300B.

To expose a physical hardware device such as SCSI HBA 44 to VM 300B, PCI passthrough module 204 (refer to FIG. 3A) obtains actual PCI resource information (e.g. vendor id, class id, subclass, base address register values, real IRQ/vector assigned to the device, etc.) from PCI resource manager 104 (refer to FIG. 3A) for the corresponding physical hardware device (e.g., SCSI HBA 44). Once the PCI resource information is obtained, PCI passthrough module 204 sets up virtual PCI device (PCI passthrough device) 399 that contains the configuration information derived from the original physical hardware device (e.g., SCSI HBA 44). PCI passthrough device 399 is hooked up to virtual PCI bus 342B that is visible to guest software 320B. As part of the process of setting up PCI passthrough device 399, a callback is registered to handle the PCI configuration cycle, so that when guest BIOS 322B or guest OS 320B performs PCI configuration access, PCI passthrough module 204 gets notified. As will be explained below with reference to FIGS. 4A and 4B, when access to the BAR registers for PCI passthrough device 399 is made, the virtual PCI subsystem is requested to allocate virtual port/memory mapped IO space. The size of the memory mapped regions is derived from the physical resource information obtained from PCI resource manager 104 of VMKernel 100B. When guest OS 320B accesses PCI passthrough device 399 through virtual PCI bus 324B, in reality, guest OS 320B is accessing underlying physical hardware device 44 if guest OS 320B does port-mapped/memory-mapped I/O to a location contained in the BAR of the corresponding hardware device.

Figure 1B:
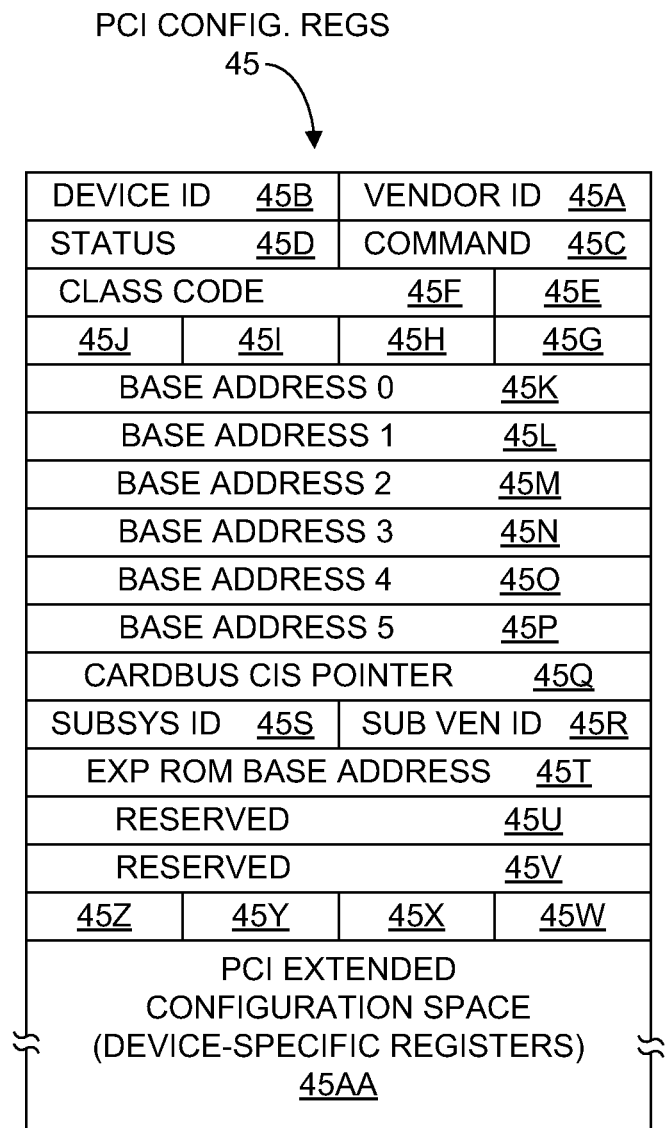
FIG. 1B illustrates a set of PCI configuration registers for the SCSI HBA PCI device of FIG. 1A.
Figure 1C:
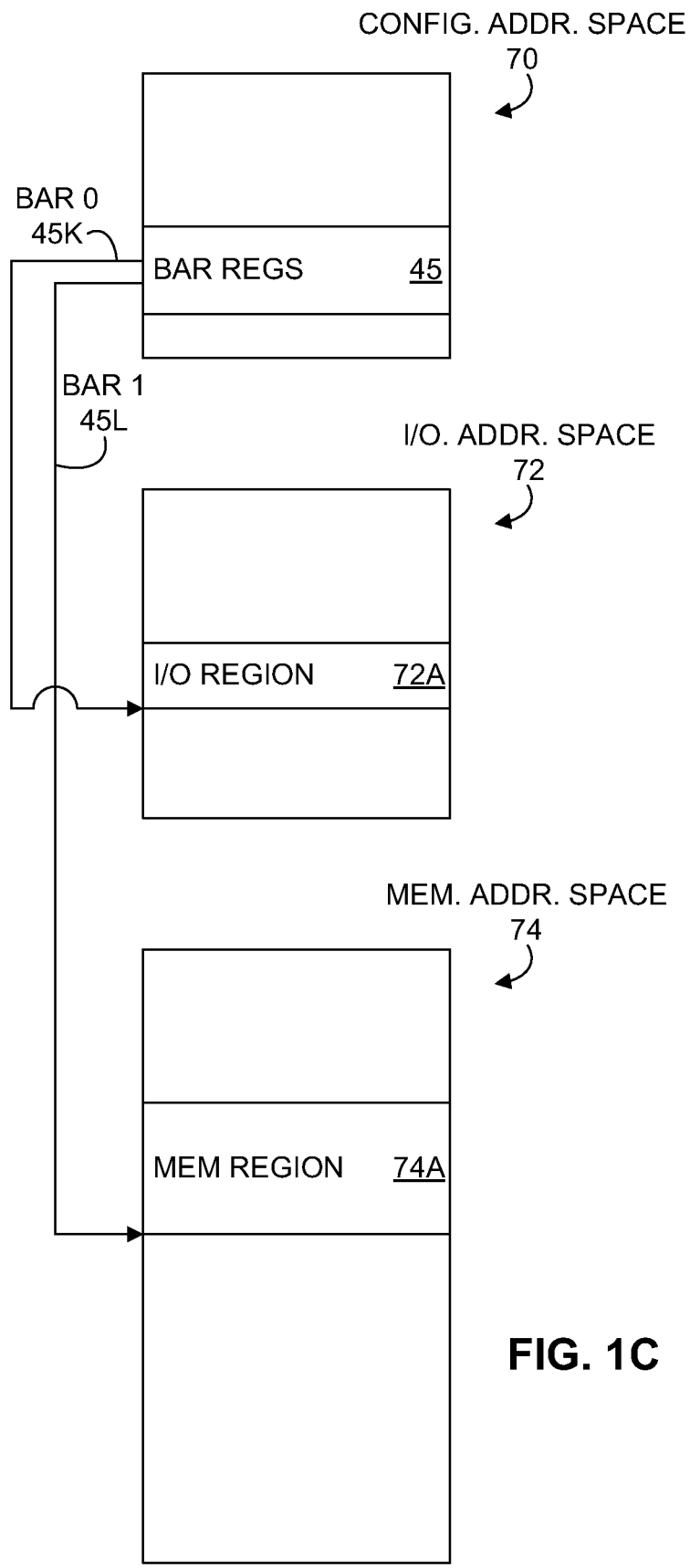
FIG. 1C illustrates a configuration address space, an I/O address space and a memory address space related to the SCSI HBA PCI device of FIG. 1A.
Figure 2C:
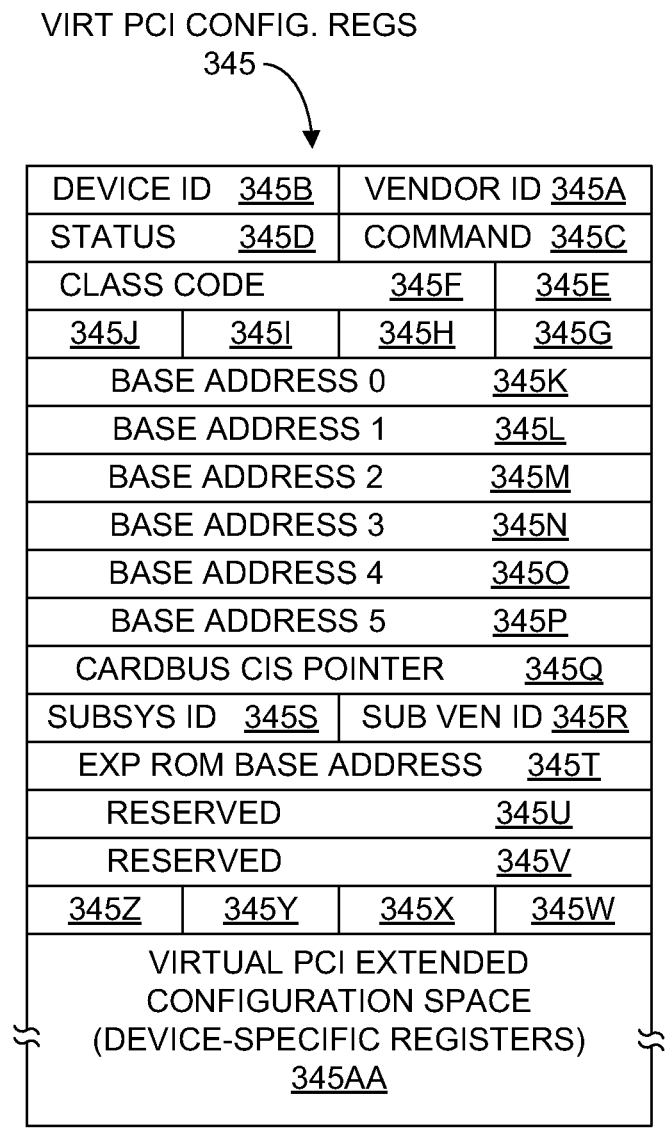
FIG. 2C illustrates a set of virtual PCI configuration registers for the virtual SCSI HBA PCI device of FIG. 2B.
Figure 2D:
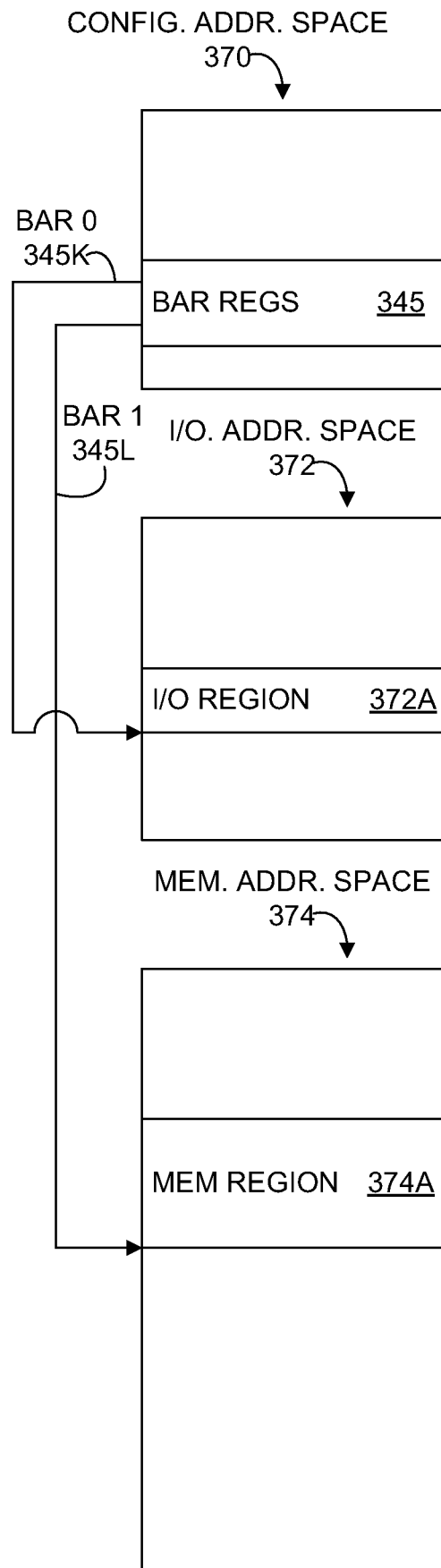
FIG. 2D illustrates a configuration address space, an I/O address space and a memory address space related to the virtual SCSI HBA PCI device of FIG. 2B.

FIG. 3C illustrates a set of virtual PCI configuration registers for the PCI passthrough device, according to one embodiment of the present invention. The PCI configuration registers of FIG. 3C have substantially the same structure as PCI configuration register 45 of FIG. 1B and virtual PCI configuration register 345 of FIG. 2C. PCI passthrough configuration registers 347 include Vendor ID register 347A, Device ID register 347B, Command register 347C, Status register 347D, Revision ID register 347E, Class Code register 347F, Cache Line Size register 347G, Latency Timer register 347H, Header Type register 347I, BIST register 347J, Base Address 0 register 347K, Base Address 1 register 347L, Base Address 2 register 347M, Base Address 3 register 347N, Base Address 4 register 347O, Base Address 5 register 347P, CardBus CIS Pointer register 347Q, Subsystem Vendor ID register 347R, Subsystem ID register 347S, Expansion ROM Base Address register 347T, first reserved register 347U, second reserved register 347V, Interrupt Line register 347W, Interrupt Pin register 347X, Min_Gnt register 347Y and Max_Lat register 347Z. FIG. 3C also shows Virtual PCI Extended Configuration Space (including a set of Device-Specific Registers) 347AA.

Some of the contents of PCI passthrough configuration registers 347 may be different from the contents of configuration register 45 of the corresponding actual physical hardware device. For example, command register 347C, status register 347D, BAR registers 347K through 347P, and expansion ROM base address 347T, and device specific register 347AA may be different from the content of corresponding registers 45 of the corresponding actual physical hardware device. PCI passthrough configuration register 347 is created and maintained by PCI passthrough module 204 so that VMs 300 have direct access to the underlying actual physical device by having access to configuration register 347 of passthrough device 399.

Figure 4A:
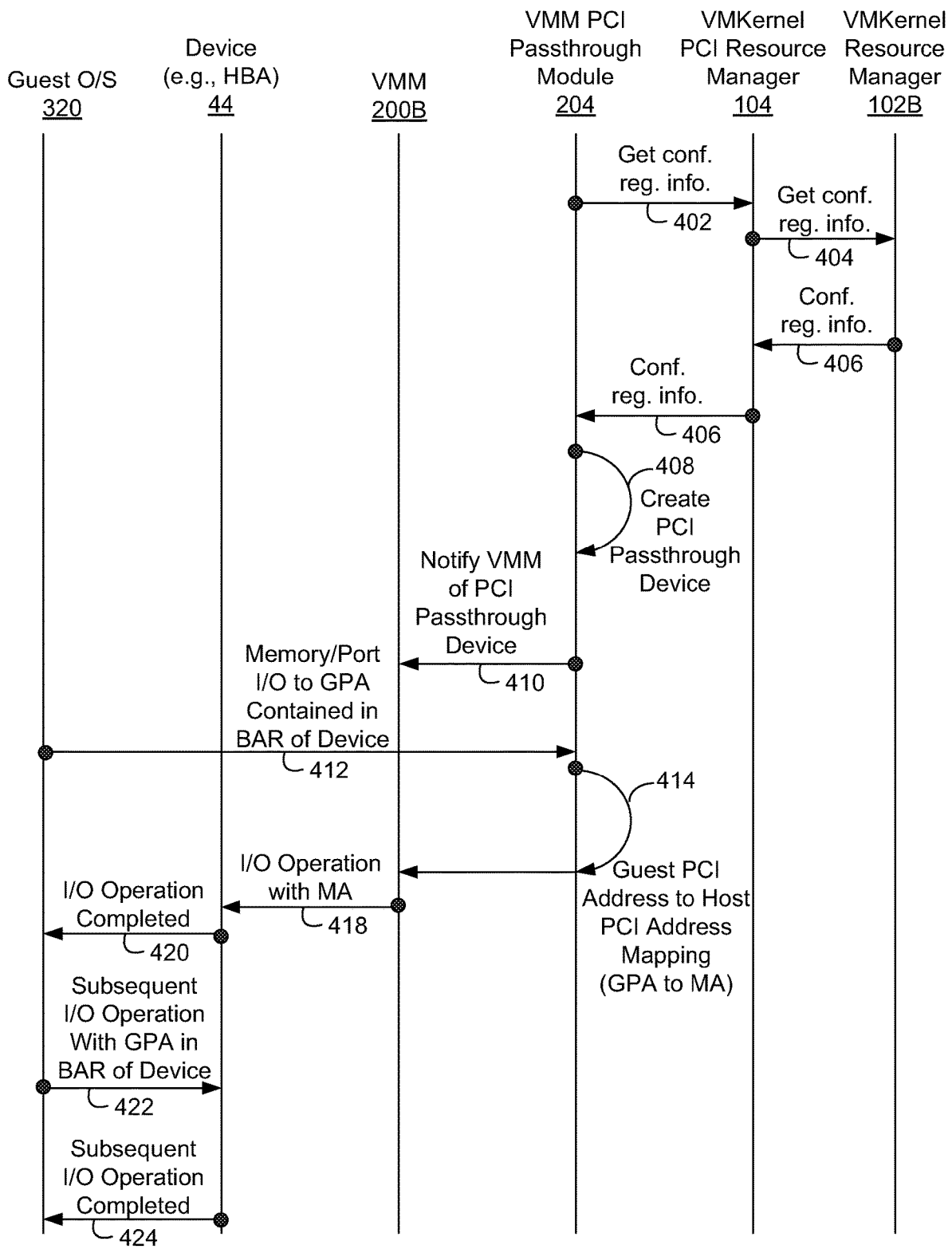
FIG. 4A is an interaction diagram illustrating how the PCI passthrough device is created and used in non-trap mode, according to one embodiment of the present invention.

FIG. 4A is an interaction diagram illustrating how a PCI passthrough device is created and used in non-trap mode, according to one embodiment of the present invention. Referring to FIGS. 3B and 4A, to create PCI passthrough device 399 corresponding to an underlying hardware device (e.g., SCSI HBA 44), (step 402) VMM PCI passthrough module 204 requests 402 VMKernel PCI resource manager 104 for configuration register information corresponding to the underlying hardware device. (step 404) VMKernel PCI resource manager 104, in turn, forwards such request to VMKernel resource manage 102B that actually manages the configuration registers of the hardware devices. (step 406) VMKernel resource manager 102B returns the configuration register information to VMKernel PCI resource manager 104, which information is then passed on to VMM PCI passthrough module 204. (step 408) VMM PCI passthrough module 204 creates PCI passthrough device 399 corresponding to the hardware device (SCSI HBA 44) by creating virtual PCI configuration registers 347 for PCI passthrough device 399, where virtual PCI configuration registers 347 resemble configuration register information 45 of the underlying hardware device (SCSI HBA 44), with additional changes as explained above with reference to FIG. 3C. (step 410) VMM PCI passthrough module 204 then notifies VMM 200B of the creation of PCI passthrough device 399.

Once PCI passthrough device 399 is created, it can be accessed in read/write operations in either trap mode or non-trap mode. The embodiment illustrated in FIG. 4A uses non-trap mode. Specifically, (step 412) when guest OS 320B issues a memory-mapped/port-mapped I/O operation with a guest physical address (GPA) contained within the BAR (Base Address Register) of PCI passthrough device 399, (step 414) VMM PCI passthrough device 204 maps the guest physical address (hereinafter, "GPA") with a corresponding machine address (hereinafter, "MA") (guest PCI address to host PCI address mapping). (step 418) VMM 200B performs I/O operation 418 with the MA by accessing actual physical device 44 (e.g., SCSI HBA) with the MA, (step 420) to complete the R/W operation. Once the GPA to MA translation is set up by VMM PCI passthrough module 204, no further intervention by VMM PCI passthrough module 204 is needed. (step 422) Subsequent I/O operations with a GPA within the BAR of the physical device (step 424) can be performed directly without intervention from VMM 200B and VMM PCI passthrough module 204, resulting in faster direct access to the device (e.g., HBA 44). Therefore, in non-trap mode, guest OS 320B of the virtualized computer system accesses physical device 44 directly, in contrast to conventional virtualized computer systems.

Figure 4B:
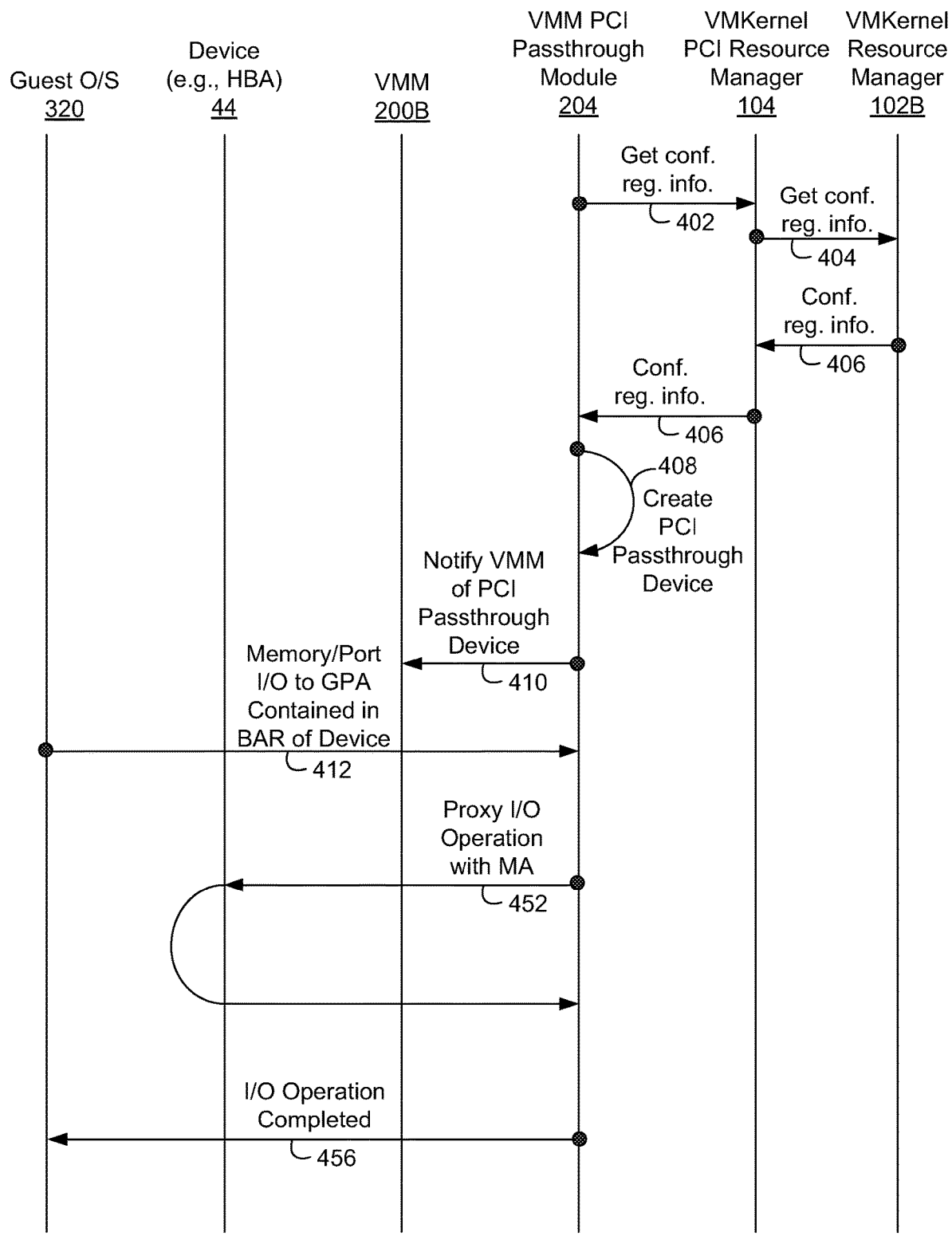
FIG. 4B is an interaction diagram illustrating how the PCI passthrough device is created and used in trap mode, according to one embodiment of the present invention.

FIG. 4B is an interaction diagram illustrating how a PCI passthrough module is created and used in a trap mode, according to one embodiment of the present invention. The embodiment shown in FIG. 4B is substantially the same as the non-trap mode embodiment of FIG. 4A in steps 402 through 412, except that steps 452 through 456 in FIG. 4B replace steps 414 through 424 in FIG. 4A. Specifically, (step 412) when guest OS 320B issues a memory-mapped/port-mapped I/O operation with a guest physical address (GPA) contained within the BAR (Base Address Register) of PCI passthrough device 399, VMM PCI passthrough module 204 issues proxy I/O operation 452, with an MA corresponding to the GPA, directly to hardware device 44 which performs the I/O operation. (step 456) VMM PCI passthrough module 204 notifies guest O/S 320B of the completion of the I/O operation. As is clear from FIG. 4B, in the trap mode, VMM PCI passthrough module 204 "traps" I/O operations from guest/OS 320B to physical device 44. Thus, guest O/S 320B has direct access to physical device 44 through VMM PCI passthrough module 204. Trap mode is beneficial when, for example, the behavior of physical device 44 is to be monitored by VMM 200B for debugging purposes.

An interesting problem arises when physical device 44 is exposed to VMs 300. When device drivers 324B of guest OS 320B communicate with physical device 44 to perform I/O, device drivers 324B specify the guest physical address (GPA) for the data transfer. However, that GPA may no longer be a valid address since the mapping between GPA and MA could have changed, or some other VM 300B could be running, etc. Thus, physical device 44 needs a valid MA that backs the GPA specified by device drivers 324B. FIGS. 5A-5D below illustrate various methods to obtain DMA address(es) of I/O operations with PCI passthrough device 399.

Figure 5A:
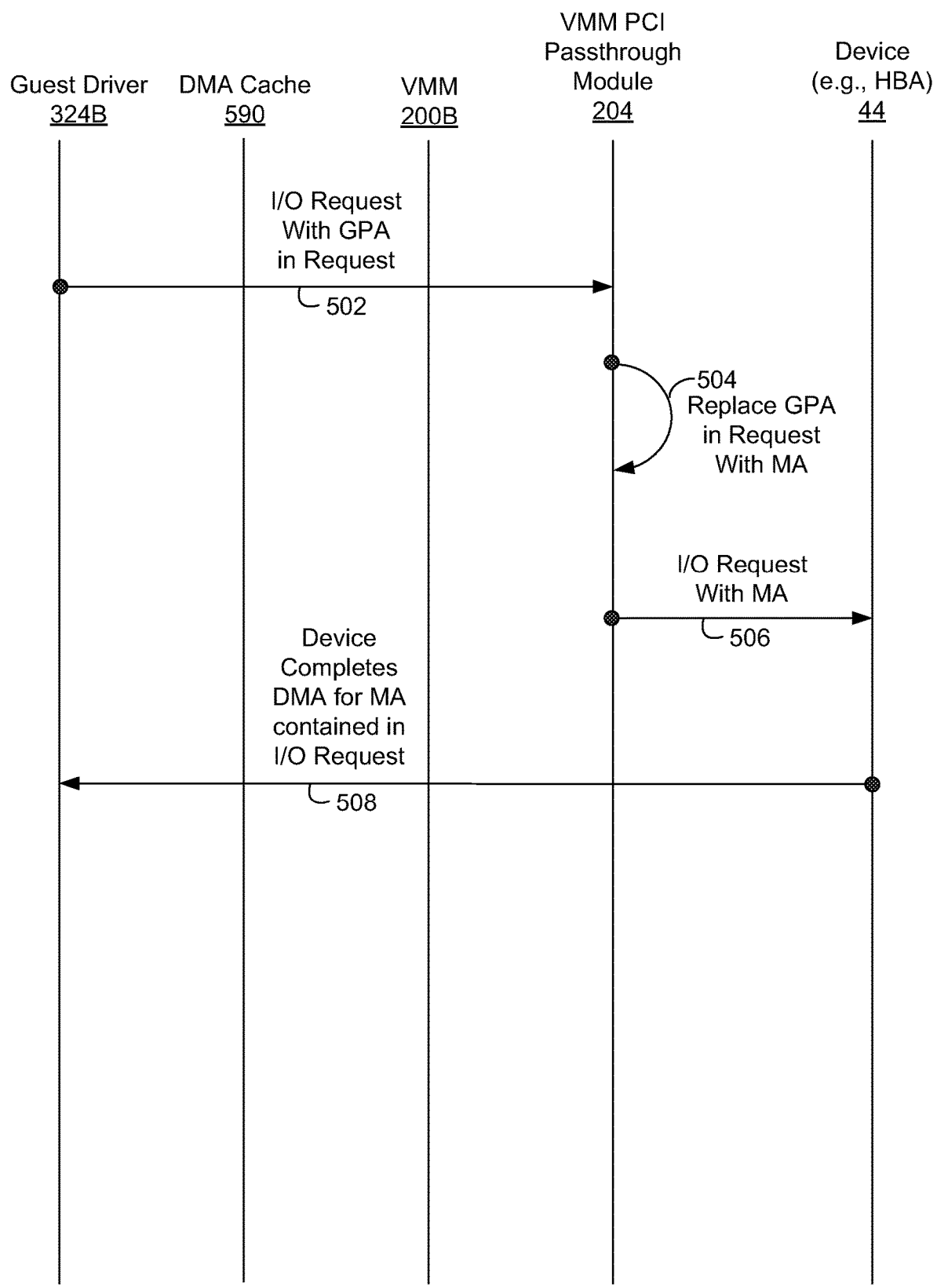
FIG. 5A is an interaction diagram illustrating I/O operation in the PCI passthrough device using callbacks for I/O mapped accesses, according to one embodiment of the present invention.

FIG. 5A is an interaction diagram illustrating I/O operation in the PCI passthrough device using callbacks for I/O mapped accesses, according to one embodiment of the present invention. (step 502) When guest driver 324B in guest OS 320B makes I/O request 502 to VMM PCI passthrough module 204 with a GPA corresponding to PCI passthrough device 399 in I/O request 502, (step 504) VMM PCI passthrough module 204 decodes the I/O request 502 and replaces the GPA in I/O request 502 with an MA corresponding to underlying hardware device 44. (step 506) VMM PCI passthrough module 204 sends an I/O request with the substituted MA to physical device 44, and (step 508) physical device 44 completes DMA using the MA contained in the I/O request of step 506 and notifies guest driver 324B. The method of FIG. 5A requires that VMM PCI passthrough module 204 trap all I/O requests to PCI passthrough device 399, which may affect performance. In addition, the method of FIG. 5A requires that VMM PCI passthrough module 204 understand and decode I/O requests to hardware device 44. Otherwise, there is no other virtualization overhead.

Figure 5B:
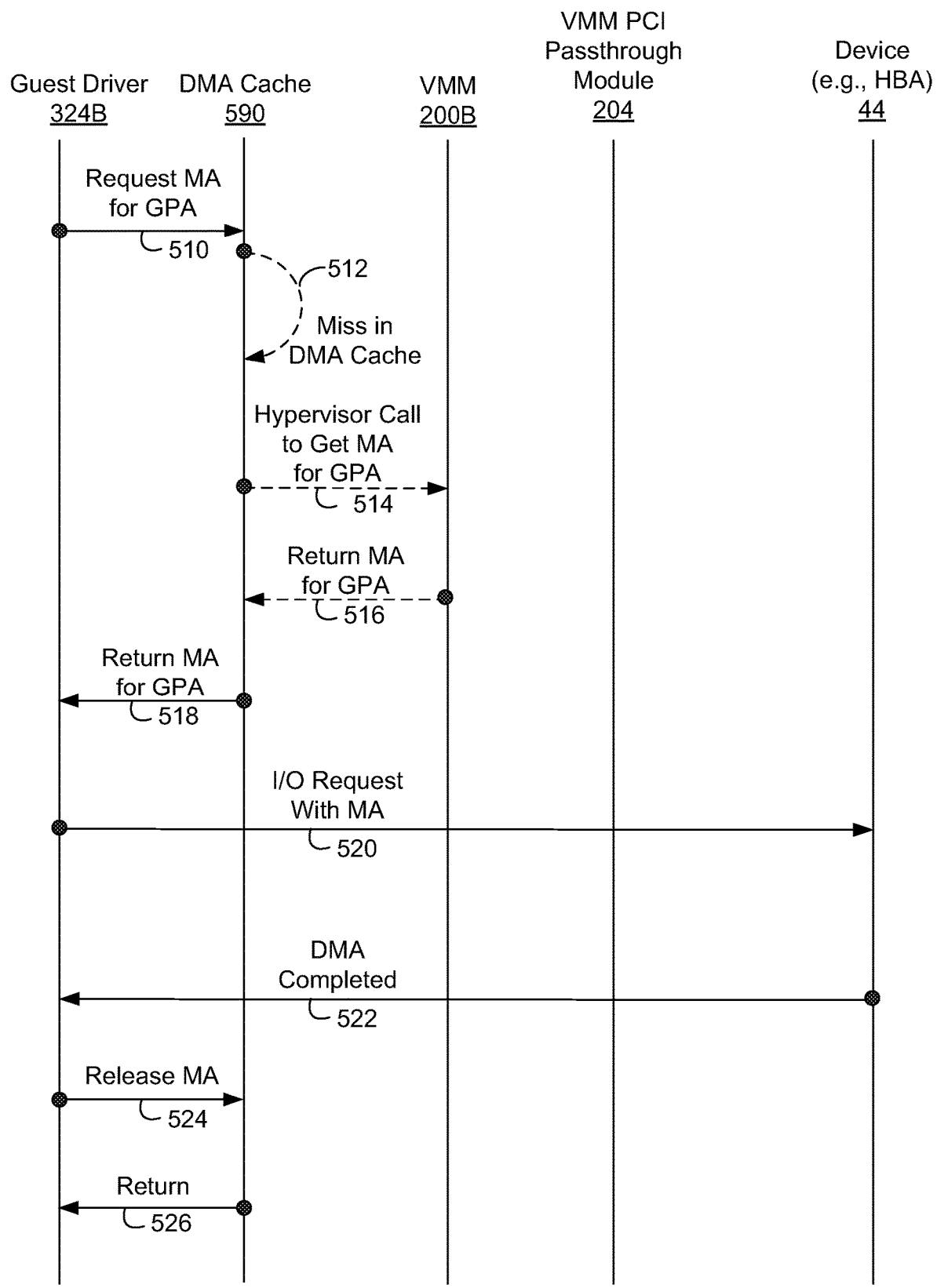
FIG. 5B is an interaction diagram illustrating I/O operation in the PCI passthrough device using driver change, according to one embodiment of the present invention.

FIG. 5B is an interaction diagram illustrating I/O operation in a PCI passthrough device using driver change, according to one embodiment of the present invention. The method of FIG. 5B trusts guest driver 324B in guest OS 320B, and modifies the driver code so that guest driver 324B makes the I/O request with an MA rather than the GPA. Referring to FIG. 5B, (step 510) first guest driver 324B requests DMA cache 590 (included in guest OS 320B) for an MA corresponding to the GPA in the I/O request. (step 512) If the MA corresponding to the GPA is not available in DMA cache 590, resulting in a miss in DMA cache 590, (step 514) DMA cache 590 makes a hypervisor call to VMM 200B to obtain the MA corresponding to the GPA, and (step 516) VMM 200B returns the corresponding MA to DMA cache 590. If the MA corresponding to the GPA is available in DMA cache 590, steps 512, 514, and 516 are skipped. In step 518, DMA cache 590 returns the MA corresponding to the GPA to guest driver 324B. Then, (step 520) guest driver 324B makes an I/O request to physical device 44 directly using the MA, and (step 522) physical device 44 completes DMA using the MA in the request of step 520 and returns the results to guest driver 324B. Then, (step 524) guest driver 324B releases the MA to GPA mapping back to DMA cache 590, and (step 526) the process returns to guest driver 324B for the next I/O request. In the method of FIG. 5B, a hashing can be implemented for repeated GPA to MA mappings. The method of FIG. 5B is somewhat intrusive in the sense that modification of guest driver 324B is needed, but a significant performance gain can be achieved thanks to direct access to physical device 44.

Figure 5C:
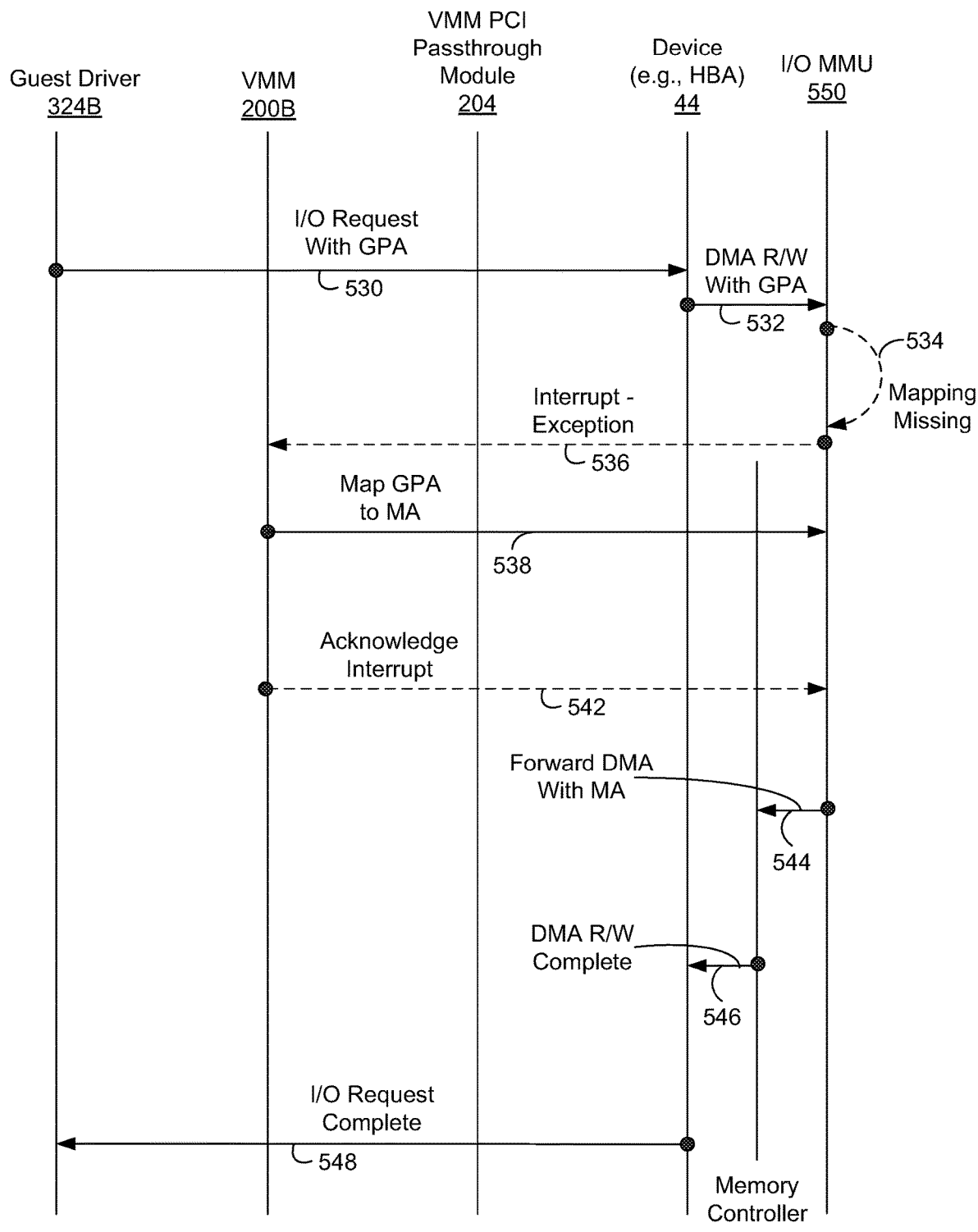
FIG. 5C is an interaction diagram illustrating I/O operation in the PCI passthrough device using on-demand mapping with an I/O MMU (Input/Output Memory Management Unit), according to one embodiment of the present invention.

FIG. 5C is an interaction diagram illustrating I/O operation in a PCI passthrough device using on-demand mapping with an I/O MMU (Input/Output Memory Management Unit), according to one embodiment of the present invention. The method of FIG. 5C is efficient and less intrusive than, for example, the method in FIG. 5B, but it only works for devices that can set up address translation (I/O MMU) in the physical device such that an interrupt/exception can be generated for a missing mapping from GPA to MA. Referring to FIG. 5C, (step 530) guest driver 324B makes an I/O request to hardware device 44 with a GPA corresponding to PCI passthrough device 399 contained in the request. (step 532) Hardware device 44 issues a DMA request with the GPA contained in the I/O request. I/O MMU (Input/Output Memory Management Unit) 550 (which may be included in HBA 44, for example) intercepts the DMA request to perform GPA to MA mapping before the DMA request is forwarded to memory. (step 534) If the GPA to MA mapping is missing in I/O MMU 550, (step 536) an interrupt/exception is issued to VMM 200B through, for example, a message signaled interrupt (MSI) on PCI bus 342B, (step 539) to set up the mapping from the specified GPA to the corresponding MA. Then, (step 542) VMM 200B acknowledges the interrupt to I/O MMU 550. After I/O MMU 550 determines the correct GPA to MA mapping, (step 544) I/O MMU 550 forwards the DMA request with the MA to memory controller 560 (which is included in system hardware 30). Memory controller 560 performs the DMA operation, and (step 546) informs hardware device 44 that the DMA R/W operation is complete. (step 548) Hardware device 44 informs guest driver 324B that the I/O request by physical device 44 is complete. Note that, when VMM PCI passthrough module 204 wants to reclaim the MA, it can issue a request to I/O MMU 550 to flush its memory mapping.

Figure 5D:
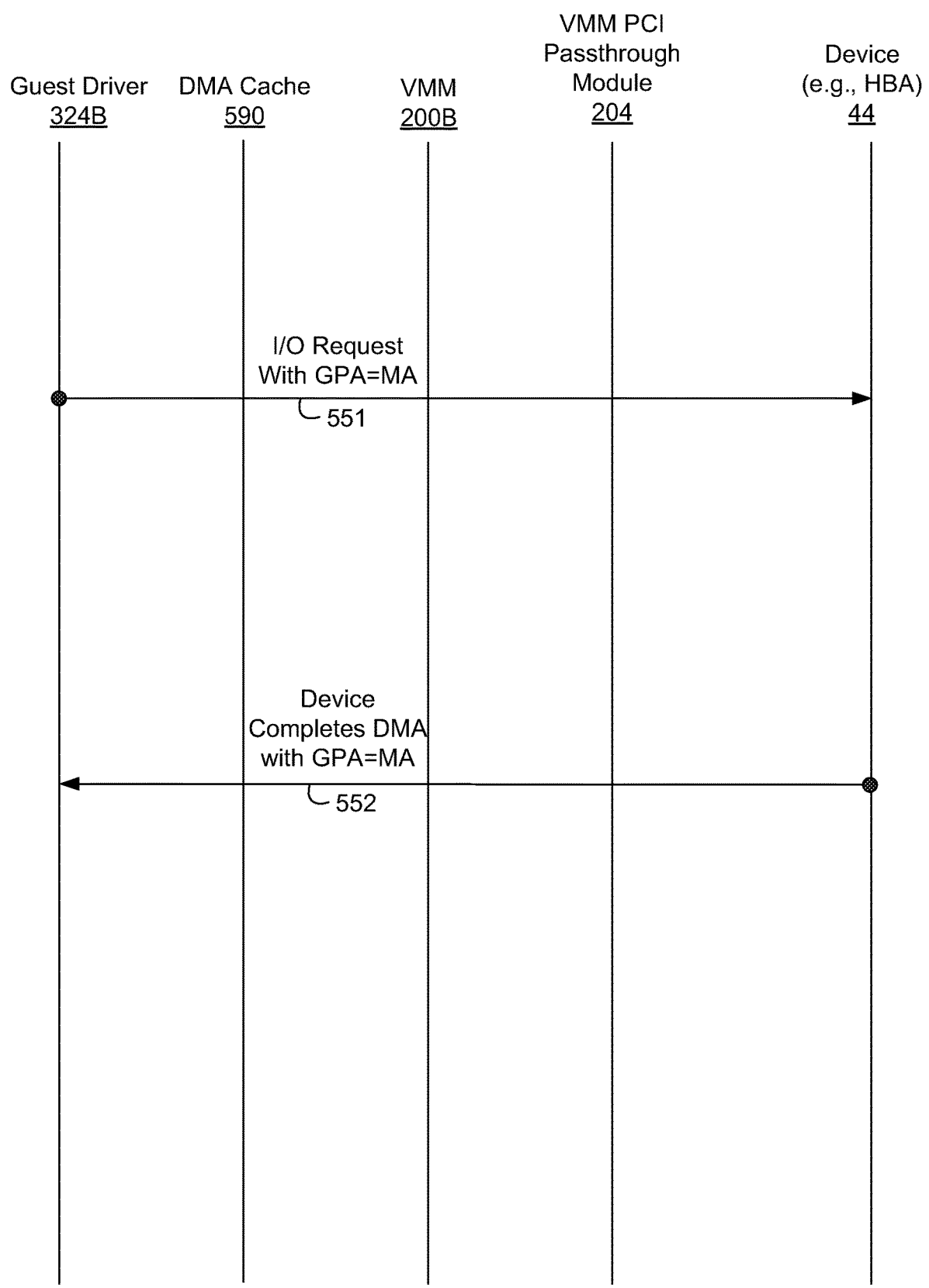
FIG. 5D is an interaction diagram illustrating I/O operation in the PCI passthrough device using identity mapping, according to one embodiment of the present invention.

FIG. 5D is an interaction diagram illustrating I/O operation in a PCI passthrough module using identity mapping, according to one embodiment of the present invention. For VM 300B in this embodiment, the GPA and MA are identity-mapped such that each GPA corresponds to the same MA. For example, GPA 0 corresponds to MA 0. In this case, VM 300B (guest driver 324B) can use the GPA to make an I/O request to physical device 44, because the GPA and MA are the same and there is no need to obtain GPA to MA mapping. Thus, referring to FIG. 5D, (step 551) guest driver 324B issues an I/O request to physical device 44, with a GPA that is identical to the MA. (step 552) physical device 44 just completes the DMA using the GPA. The embodiment of FIG. 5D allows PCI passthrough devices 399 to operate without requiring driver changes or I/O MMUs.

Figure 6:
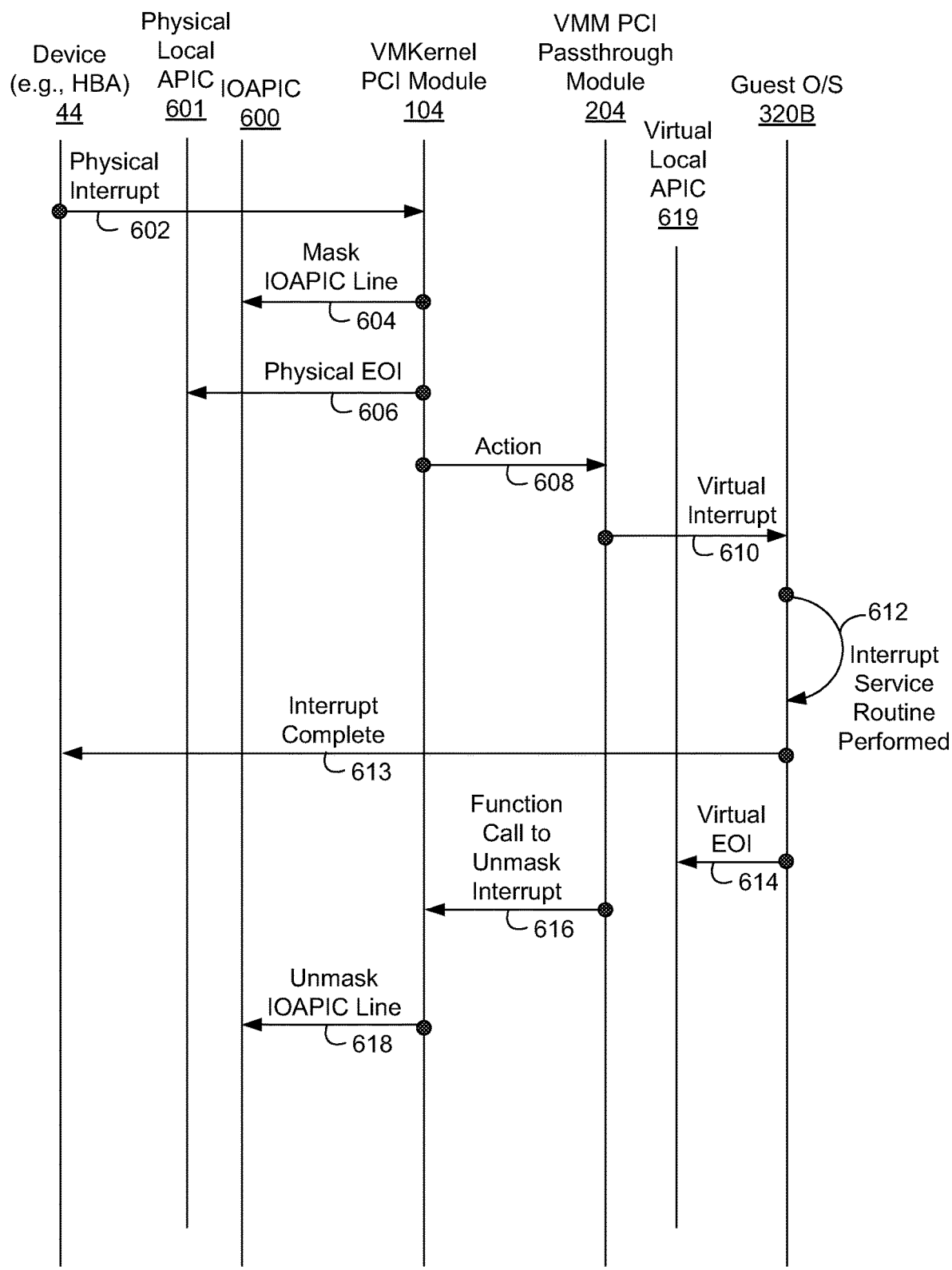
FIG. 6 is an interaction diagram illustrating interrupt handling in the PCI passthrough device using physical I/O APIC (Advanced Programmable Interrupt Controller), according to one embodiment of the present invention.
Figure 7A:
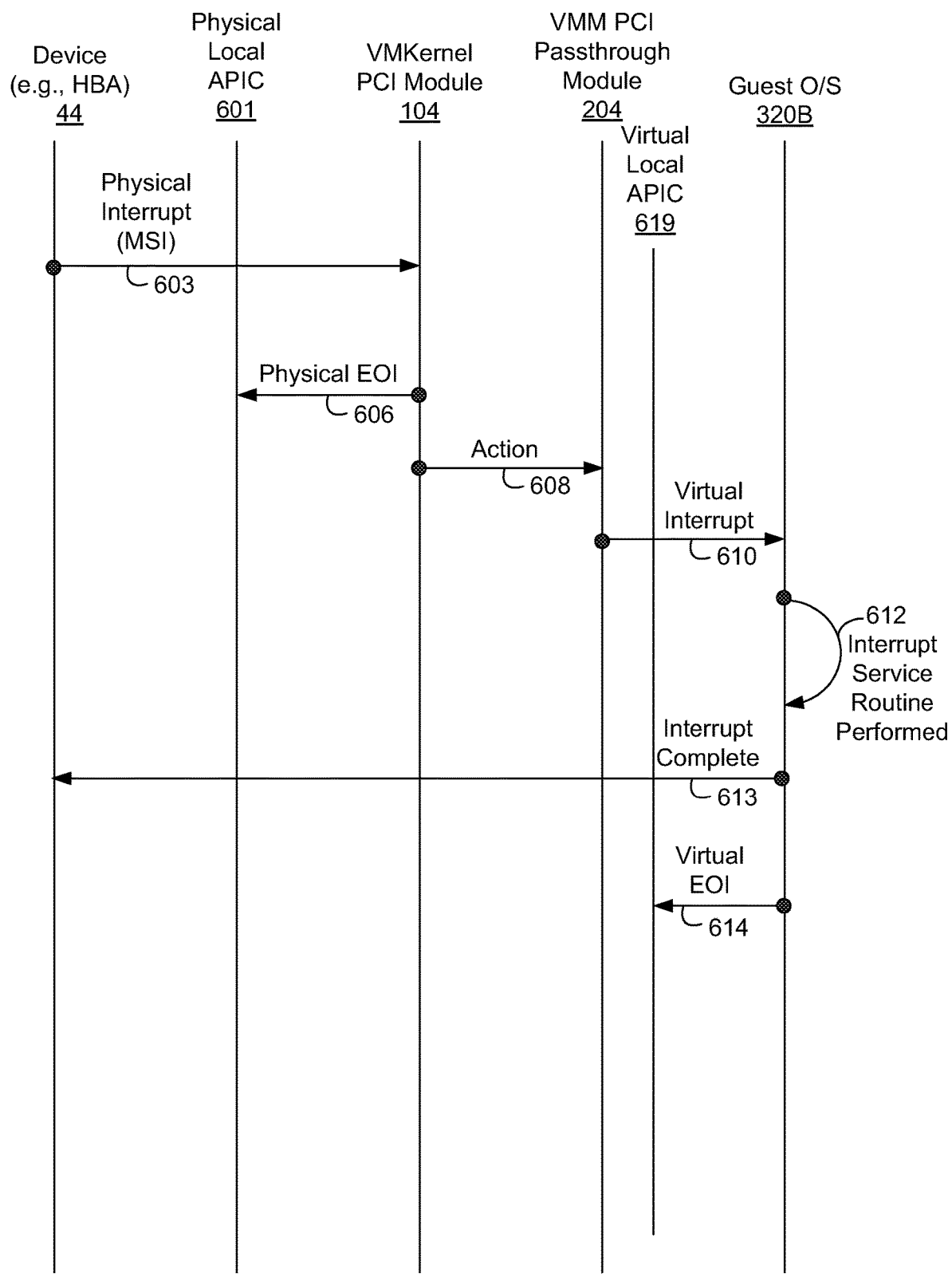
FIG. 7A is an interaction diagram illustrating interrupt handling in the PCI passthrough device using a physical MSI/MSI-X device with virtual I/O APIC, according to one embodiment of the present invention.
Figure 7B:
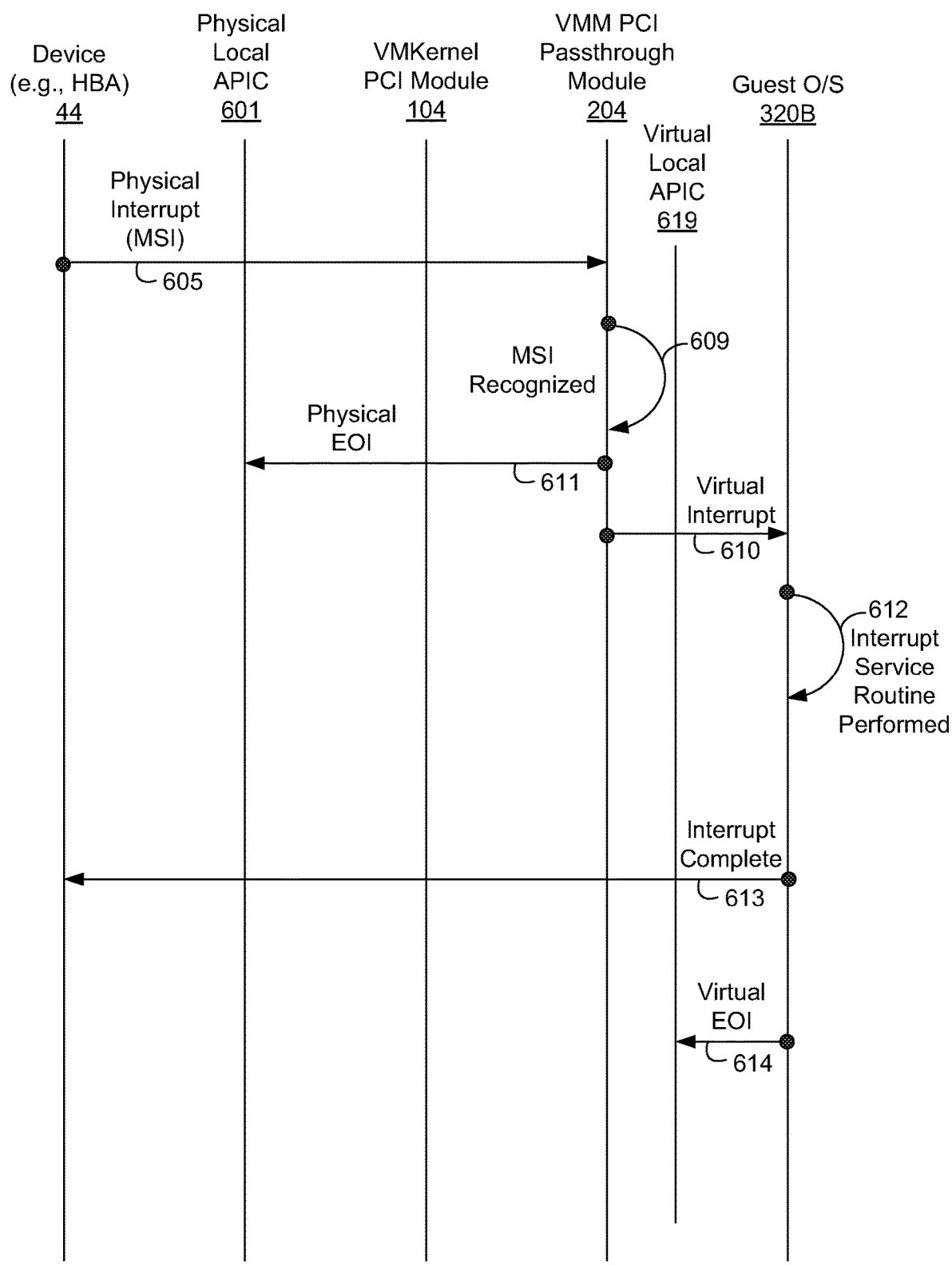
FIG. 7B is an interaction diagram illustrating interrupt handling in the PCI passthrough device using a physical MSI/MSI-X device with virtual MSI/MSI-X, according to one embodiment of the present invention.

Another interesting problem arises when physical device 44 is exposed to VMs 300B. Specifically, when hardware device 44 wants to notify device driver 324B of guest OS 320B, it generates an interrupt. However, in a virtual machine environment, guest OS 320B that is communicating with physical device 44 may not be running at the time of interrupt generation. FIGS. 6, 7A, and 7B illustrate various methods of handling interrupts in PCI passthrough device 399.

FIG. 6 is an interaction diagram illustrating interrupt handling in a PCI passthrough module using physical I/O APIC (Advanced Programmable Interrupt Controller), according to one embodiment of the present invention. (step 602) When hardware device 44 generates a physical interrupt, (step 604) VMKernel PCI module 104 first masks the I/O APIC line, and (step (606) issues a physical EOI (End of Interrupt) to physical local APIC 601 (which may be part of the CPU 32)—the I/O APIC line is a shared interrupt line. Step 604 is necessary to enable sharing of the I/O APIC line, and to prevent interrupt storms. Then, (step 608) VMKernel PCI module 104 posts a monitor action to VMM PCI passthrough module 204, which, in turn, (step 610) issues a virtual interrupt to guest O/S 320B—the virtual corresponds to the physical interrupt generated at step 602. (step 612) Guest O/S 320B executes the interrupt service routine. From the perspective of guest OS 320B and device 44, (step 613) the interrupt is now complete. (step 614) Guest O/S 320B also issues virtual EOI 614 to virtual local APIC 619 (which may be part of virtual CPU 332B), by writing to the virtual local APIC's EOI register. VMM PCI passthrough module 204 traps access to the local APIC's EOI register, and determines that there is a physical interrupt with an I/O APIC that needs to be unmasked. Thus, (step 616) VMM PCI passthrough module 204 makes a function call to VMKernel PCI module 104 to unmask the interrupt. In response, (step 618) VMKernel PCI module 104 unmasks the I/O APIC line by mapping the I/O APIC's physical address and manipulating the interrupt vector's entry directly.

The method of FIG. 6 has some inefficiency, in that it has interrupt latency due to the need for masking and unmasking the shared interrupt line of the I/O APIC. Also, if a physical interrupt line is shared by multiple devices, it is possible that the virtualized computer system may deadlock if the system tries to service some other request while the interrupt line is masked. FIGS. 7A and 7B illustrate a method that handles interrupt in PCI passthrough devices with lower interrupt latencies and without the need for masking interrupt lines by using MSI (Message Signaled Interrupts) or MSI-X defined in the PCI local bus specification to generate non-shared, edge-triggered interrupts that can be programmed and acknowledged in a device-independent manner through the PCI configuration space. The method of FIGS. 7A and 7B can prevent an interrupt storm, avoid potential deadlocking, and provide fast turnaround time in handling interrupts.

FIG. 7A is an interaction diagram illustrating interrupt handling in a PCI passthrough module using a physical MSI/MSI-X device with virtual I/O APIC that is level triggered, according to one embodiment of the present invention. In the embodiment of FIG. 7A, the allocation of the MSI/MSI-X is handled by VMKernel PCI module 104 in a manner opaque to guest OS 320B. Referring to FIG. 7A, (step 603) when hardware device 44 generates a physical interrupt (MSI) to VMKernel PCI module 104, (step 606) VMKernel PCI module 104 issues a physical EOI (End of Interrupt) to physical local APIC 601. Then, (step 608) VMKernel PCI module 104 posts a monitor action to VMM PCI passthrough module 204, which, in turn, (step 610) issues a virtual interrupt to guest O/S 320B—the virtual interrupt corresponding to the physical interrupt of step 603. (step 612) guest O/S 320B executes the interrupt service routine, and (step 613) notifies physical device 44 that the interrupt has been completed. Also, (step 614) guest O/S 320B issues a virtual EOI to virtual local APIC 619 by writing to the local APIC's EOI register. There is a small window from the time the physical device interrupt is acknowledged at step 613 by guest O/S 320B and virtual EOI of step 614, during which another physical interrupt may be generated. This situation is handled carefully to prevent lost interrupts by noting that another interrupt has been received while the previous level virtual interrupt of step 610 was still asserted and not de-asserting the interrupt level in this case on the virtual EOI of step 614.

FIG. 7B is an interaction diagram illustrating interrupt handling in a PCI passthrough module using a physical MSI/MSI-X device with virtual MSI/MSI-X, according to one embodiment of the present invention. The embodiment of FIG. 7B passes through the MSI/MSI-X capability to guest OS 320B in the virtual device's PCI configuration space 347 without transitioning to VMKernel PCI module 104. Referring to FIG. 7B, (step 605) physical device 44 generates a physical interrupt (MSI) to VMM PCI passthrough module 204. (step 609) VMM PCI passthrough module 204 recognizes the MSI interrupt, (step 611) issues a physical EOI to physical local APIC 601, and (step 610) issues a virtual interrupt 610 to guest O/S 320B—the virtual interrupt corresponding to the physical interrupt of step 605. (step 612) Guest O/S 320B executes the interrupt service routine, and (step 613) notifies physical device 44 that the interrupt has been completed. Also, (step 614) guest O/S 320B issues a virtual EOI to virtual local APIC 619 by writing to the local APIC's EOI register. The embodiment of FIG. 7B would be useful when more operating systems implement MSI/MSI-X.

Although the embodiment described above relates to a specific physical computer system, having a specific hardware platform and configuration, and a specific software platform and configuration, further embodiments of the present invention may be implemented in a wide variety of other physical computer systems. In addition, although the embodiment described above relates to a specific virtual computer system implemented within the physical computer system, further embodiments of the present invention may be implemented in connection with a wide variety of other virtual computer systems. In further addition, although the embodiment described above relates to a specific physical device, further embodiments of the present invention may be implemented in connection with a wide variety of other physical devices. In particular, although the embodiment described above relates to a SCSI HBA card interfacing to a PCI bus for providing a VM with direct access to a SCSI device/HBA, further embodiments of the present invention may be implemented in connection with a wide variety of other physical devices. For example, embodiments may be implemented in connection with a different physical device that also interfaces to a PCI bus, but that implements a different function, such as a fiber channel HBA, for example. Alternatively, further embodiments may be implemented in connection with a physical device that interfaces with a different type of bus, or that interfaces with the physical computer system in some other way, and that implements any of a variety of functions.

Upon reading this disclosure, those of ordinary skill in the art will appreciate still additional alternative structural and functional designs for providing a virtual machine with direct access to physical hardware devices. For example, embodiments of the present invention are not limited to exposing PCI-devices to a guest operating system, but can be used to expose other hardware devices connected to a virtualized computer system through other types of communication interfaces. Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

One or more embodiments of the present invention may be implemented as one or more computer programs or as one or more computer program modules embodied in one or more computer readable media. The computer readable media may be based on any existing or subsequently developed technology for embodying computer programs in a manner that enables them to be read by a computer. For example, the computer readable media may comprise one or more CDs (Compact Discs), one or more DVDs (Digital Versatile Discs), some form of flash memory device, a computer hard disk and/or some form of internal computer memory, to name just a few examples. An embodiment of the invention, in which one or more computer program modules is embodied in one or more computer readable media, may be made by writing the computer program modules to any combination of one or more computer readable media. Such an embodiment of the invention may be sold by enabling a customer to obtain a copy of the computer program modules in one or more computer readable media, regardless of the manner in which the customer obtains the copy of the computer program modules. Thus, for example, a computer program implementing an embodiment of the invention may be purchased electronically over the Internet and downloaded directly from a vendor's web server to the purchaser's computer, without any transference of any computer readable media. In such a case, writing the computer program to a hard disk of the web server to make it available over the Internet may be considered a making of the invention on the part of the vendor, and the purchase and download of the computer program by a customer may be considered a sale of the invention by the vendor, as well as a making of the embodiment of the invention by the customer. Moreover, one or more embodiments of the present invention may be implemented wholly or partially in hardware, for example and without limitation, in processor architectures intended to provide hardware support for VMs.

What is claimed is:

1. A method executed in a virtualized computer system that includes a processor, a memory, and a hardware device, the method comprising:
   obtaining information corresponding to the hardware device;
   creating, within virtualization software, a passthrough device corresponding to the hardware device, the passthrough device enabling an application to have access to the hardware device in either a trap mode or a non-trap mode, the passthrough device having one or more guest physical addresses in a base address register (BAR) for input/output (I/O) operations to the hardware device, the hardware device defining one or more machine addresses in the memory for the I/O operations;
   identifying a guest physical address (GPA) of the one or more guest physical addresses for an I/O operation of the I/O operations;
   upon determining that the GPA is contained within the BAR of the passthrough device, mapping the GPA to a corresponding machine address (MA) of the defined one or more machine addresses, and allowing the application to have direct access to the hardware device using the MA;
   sending, by the application, the I/O operation with the MA; and
   enabling the I/O operation to the hardware device to be performed in either trap mode or non-trap mode using the MA.

2. The method of claim 1, further comprising:
   receiving, by the virtualization software, the I/O operation from the application, the I/O operation identifying the GPA;
   mapping, by the virtualization software, the GPA to the MA;
   replacing, by the virtualization software, the GPA in the I/O operation with the MA; and
   sending, by the virtualization software, the I/O operation to the hardware device using the MA.

3. The method of claim 1, further comprising:
   a direct memory access (DMA) cache requesting the virtualization software for a mapping of the GPA to the MA; and
   receiving and storing, by the DMA cache from the virtualization software, the mapping of the GPA to the MA, wherein the I/O operation is sent, by the virtualization software, to the hardware device using the MA corresponding to the GPA based on the stored mapping.

4. The method of claim 3, wherein storing the mapping of the GPA to the MA includes implementing a hash of mappings in the DMA cache.

5. The method of claim 3, further comprising:
   receiving a next I/O request from the application to access the hardware device;
   accessing the stored mapping of the GPA to the MA in the DMA cache;
   providing by the DMA cache, the MA corresponding to the GPA to the next I/O request based on the stored mapping;
   sending, by the application, the next I/O request with the MA corresponding to the GPA; and
   enabling execution of the next I/O request to the hardware device using the MA corresponding to the GPA.

6. The method of claim 1, further comprising:
   submitting, by the application, to the hardware device, an I/O request using the GPA;
   submitting, by the hardware device to an I/O memory management unit (MMU), the I/O request using the GPA; and
   altering, by the I/O MMU, the I/O request to use the MA.

7. The method of claim 6, further comprising:
   the I/O MMU requesting the virtualization software to provide a mapping of the GPA to the MA; and
   receiving, by the I/O MMU from the virtualization software, the mapped MA.

8. A non-transitory computer readable medium having computer executable instructions that, when executed by a processor, cause the processor to:
   obtain information corresponding to a hardware device;
   create, within virtualization software, a passthrough device corresponding to the hardware device, the passthrough device enabling an application to have access to the hardware device in either a trap mode or a non-trap mode, the passthrough device having one or more guest physical addresses in a base address register (BAR) for input/output (I/O) operations to the hardware device, the hardware device defining one or more machine addresses in a memory for the I/O operations;

identify a guest physical address (GPA) of the one or more guest physical addresses for an I/O operation of the I/O operations;

upon determining that the GPA is contained within the BAR of the passthrough device, map the GPA to a corresponding machine address (MA) of the defined one or more machine addresses, and allow the application to have direct access to the hardware device using the MA;

send, by the application, the I/O operation with the MA; and enable the I/O operation to the hardware device to be performed in either trap mode or non-trap mode using the MA.

9. The non-transitory computer readable medium of claim 8, wherein the computer executable instructions when executed by the processor, further cause the processor to:

receive, by the virtualization software, the I/O operation from the application, the I/O operation identifying the GPA;

map, by the virtualization software, the GPA to the MA;

replace, by the virtualization software, the GPA in the I/O operation with the MA; and send, by the virtualization software, the I/O operation to the hardware device using the MA.

10. The non-transitory computer readable medium of claim 8, wherein the computer executable instructions when executed by the processor, further cause the processor to:

request the virtualization software for a mapping of the GPA to the MA by a direct memory access (DMA) cache; and receive and store, by the DMA cache from the virtualization software, the mapping of the GPA to the MA, wherein the I/O operation is sent, by the virtualization software, to the hardware device using the MA corresponding to the GPA based on the stored mapping.

11. The non-transitory computer readable medium of claim 10, wherein storing the mapping of the GPA to the MA includes implementing a hash of mappings in the DMA cache.

12. The non-transitory computer readable medium of claim 10, wherein the computer executable instructions when executed by the processor, further cause the processor to:

receive a next I/O request from the application to access the hardware device;

access the stored mapping of the GPA to the MA in the DMA cache;

provide by the DMA cache, the MA corresponding to the GPA to the next I/O request based on the stored mapping;

send, by the application, the next I/O request with the MA corresponding to the GPA; and enable execution of the next I/O request to the hardware device using the MA corresponding to the GPA.

13. The non-transitory computer readable medium of claim 8, wherein the computer executable instructions when executed by the processor, further cause the processor to:

submit, by the application, to the hardware device, an I/O request using the GPA;

submit, by the hardware device to an I/O memory management unit (MMU), the I/O request using the GPA; and alter, by the I/O MMU, the I/O request to use the MA.

14. The non-transitory computer readable medium of claim 13, wherein the computer executable instructions when executed by the processor, further cause the processor to:

request the virtualization software, by I/O MMU, to provide a mapping of the GPA to the MA; and receive, by the I/O MMU from the virtualization software, the mapped MA.

15. A virtualized computer system comprising:

a hardware device;

a memory; and a processor operationally coupled to the memory and programmed to:

obtain information corresponding to a hardware device;

create, within virtualization software, a passthrough device corresponding to the hardware device, the passthrough device enabling a transaction to have access to the hardware device in either a trap mode or a non-trap mode, the passthrough device having one or more guest physical addresses in a base address register (BAR) for input/output (I/O) operations to the hardware device, the hardware device defining one or more machine addresses in the memory for the I/O operations;

identify a guest physical address (GPA) of the one or more guest physical addresses for an I/O operation of the I/O operations;

upon determining that the GPA is contained within the BAR of the passthrough device, map the GPA to a corresponding machine address (MA) of the defined one or more machine addresses, and allow the transaction to have direct access to the hardware device using the MA;

send, by the transaction, the I/O operation with the MA; and enable the I/O operation to the hardware device to be performed in either trap mode or non-trap mode using the MA.

16. The virtualized computer system of claim 15, wherein the processor is further programmed to:

receive, by the virtualization software, the I/O operation from the transaction, the I/O operation identifying the GPA;

map, by the virtualization software, the GPA to the MA;

replace, by the virtualization software, the GPA in the I/O operation with the MA; and send, by the virtualization software, the I/O operation to the hardware device using the MA.

17. The virtualized computer system of claim 15, wherein the processor is further programmed to:

request the virtualization software for a mapping of the GPA to the MA by a direct memory access (DMA) cache; and receive and store, by the DMA cache from the virtualization software, the mapping of the GPA to the MA, wherein the I/O operation is sent, by the virtualization software, to the hardware device using the MA corresponding to the GPA based on the stored mapping.

18. The virtualized computer system of claim 17, wherein the processor is further programmed to:

receive a next I/O request from the transaction to access the hardware device;

access the stored mapping of the GPA to the MA in the DMA cache;

provide by the DMA cache, the MA corresponding to the GPA to the next I/O request based on the stored mapping;

send, by the transaction, the next I/O request with the MA corresponding to the GPA; and enable execution of the next I/O request to the hardware device using the MA corresponding to the GPA.

19. The virtualized computer system of claim 15, wherein the processor is further programmed to:

submit, by the transaction, to the hardware device, an I/O request using the GPA;

submit, by the hardware device to an I/O memory management unit (MMU), the I/O request using the GPA; and alter, by the I/O MMU, the I/O request to use the MA.

20. The virtualized computer system of claim 15, wherein the processor is further programmed to:

request the virtualization software, by I/O MMU, to provide a mapping of the GPA to the MA the I/O MMU; and receive, by the I/O MMU from the virtualization software, the MA.

* * * * *